(12) United States Patent
Jackson et al.

(10) Patent No.: US 12,256,660 B2
(45) Date of Patent: Mar. 25, 2025

(54) RAPID PULSE PROGRAMMING OF SEEDS USING UNNATURAL LIGHT EXPOSURE

(71) Applicants: Jonathan A Jackson, Dayton, OH (US); Patrick A Jackson, Dayton, OH (US); Mark J Elting, Lexington, VA (US); Tymothy Jay Henry, West Milton, OH (US); Remigio Perales, Oberlin, OH (US)

(72) Inventors: Jonathan A Jackson, Dayton, OH (US); Patrick A Jackson, Dayton, OH (US); Mark J Elting, Lexington, VA (US); Tymothy Jay Henry, West Milton, OH (US); Remigio Perales, Oberlin, OH (US)

(73) Assignee: Global Neighbor Inc, Dayton, OH (US)

( * ) Notice: Subject to any disclaimer, the term of this patent is extended or adjusted under 35 U.S.C. 154(b) by 127 days.

(21) Appl. No.: 17/967,841

(22) Filed: Oct. 17, 2022

(65) Prior Publication Data
US 2023/0119952 A1    Apr. 20, 2023

Related U.S. Application Data

(60) Provisional application No. 63/256,862, filed on Oct. 18, 2021.

(51) Int. Cl.
*A01C 1/02*    (2006.01)
*A01G 7/04*    (2006.01)

(52) U.S. Cl.
CPC .............. *A01C 1/025* (2013.01); *A01G 7/045* (2013.01)

(58) Field of Classification Search
CPC ................................ A01G 7/045; A01C 1/025
See application file for complete search history.

(56) References Cited

U.S. PATENT DOCUMENTS 2,300,727 A    11/1942 Durling
2012/0042419 A1 *  2/2012 Wilson ..................... A01C 1/00
                                                       800/298

(Continued)

FOREIGN PATENT DOCUMENTS

CN        203951930 U  * 11/2014
DE      102012209435 A1 * 12/2013 ............... A01C 1/08
WO    WO-2016033350 A1 *  3/2016 ............. A01G 7/045

*Primary Examiner* — Joshua D Huson
*Assistant Examiner* — Alanna K Peterson
(74) *Attorney, Agent, or Firm* — Elting Patents Technology LLC; Mark J Elting

(57) ABSTRACT

Rapid pulse programming of a seed, to obtain improved germination probability, and increased root mass, and crop yield, by illuminating the seed with radiation of a wavelength distribution from 300 nm to 20 microns, with a minimum average irradiance of 0.2 Watts/cm$^2$ and a maximum average irradiance of 7 Watts/cm$^2$, and having a narrow specific range of cumulative illumination energy from ½ Joules/cm$^2$ to 3 Joules/cm2 or a higher transition point cumulative illumination energy, so as to specifically engage an irradiance-sensitive and energy-sensitive hidden stimulative exposure response in the seed and so as to avoid illumination of higher cumulative illumination energy that would cause a different and destructive exposure response in the seed. Preferred wavelengths include one or both of Medium Wavelength Infrared (MWIR) radiation and an Indigo Region Illumination Distribution (IRID), which may be applied to an illuminated agricultural planter.

5 Claims, 27 Drawing Sheets

(56) References Cited

U.S. PATENT DOCUMENTS

| | | |
|---|---|---|
| 2013/0008085 A1 | 1/2013 | Aikala et al. |
| 2013/0255150 A1 | 10/2013 | Karpinski et al. |
| 2018/0255710 A1 | 9/2018 | Urban et al. |
| 2019/0281781 A1* | 9/2019 | Borrowman ............ A01C 1/025 |
| 2020/0128732 A1* | 4/2020 | Chaney ................. A01M 21/02 |

* cited by examiner

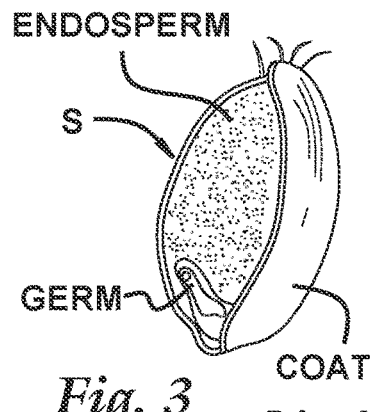
*Fig. 3* -- Prior Art --
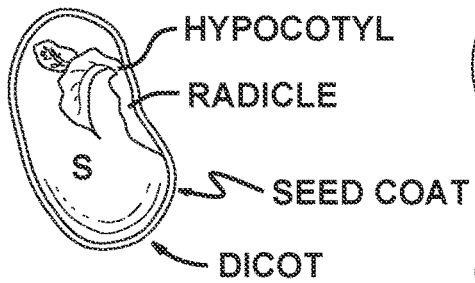
*Fig. 4* -- Prior Art --
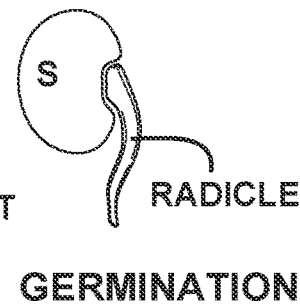
*Fig. 5*
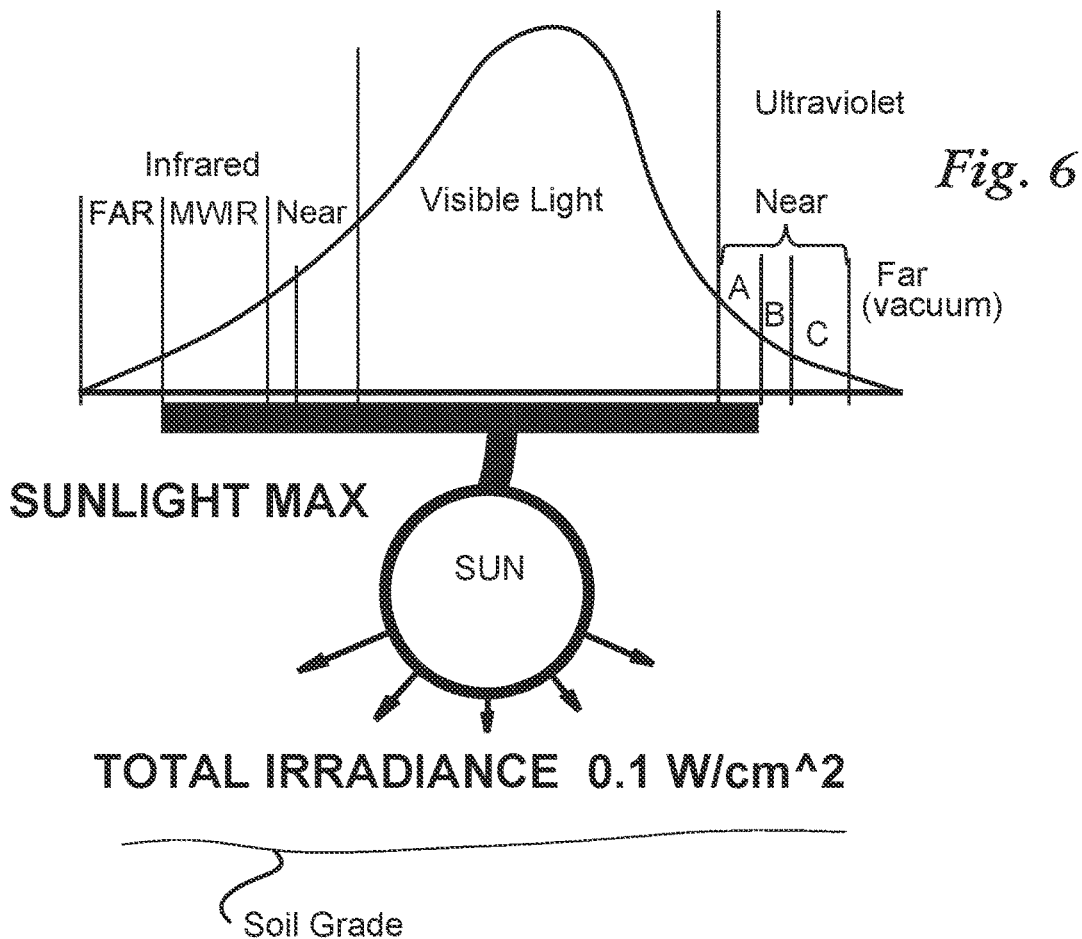
*Fig. 6*

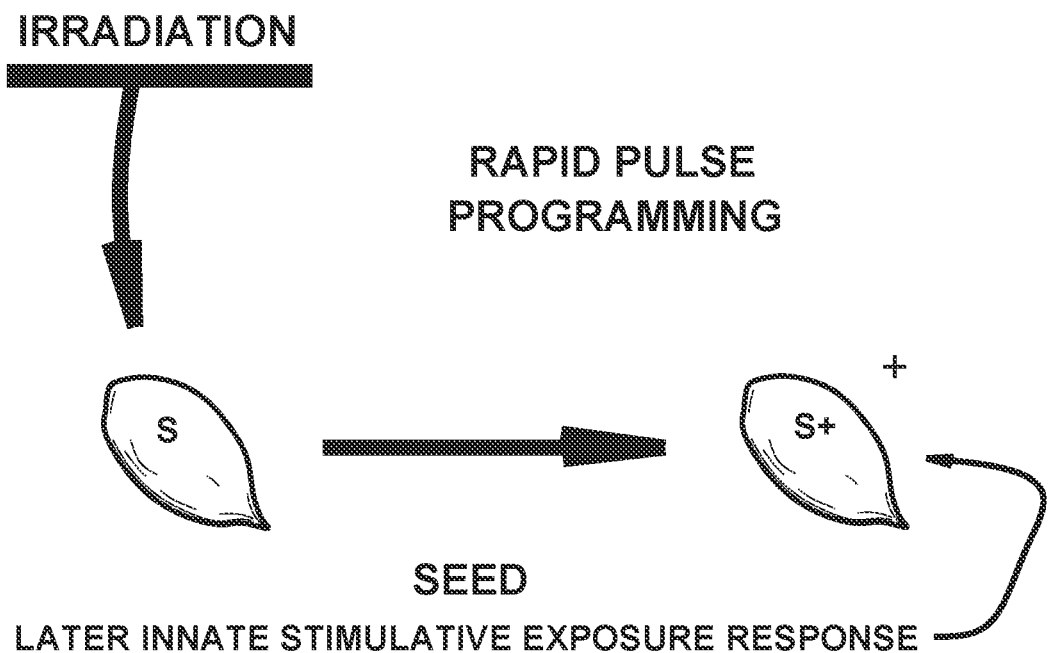
Fig. 9
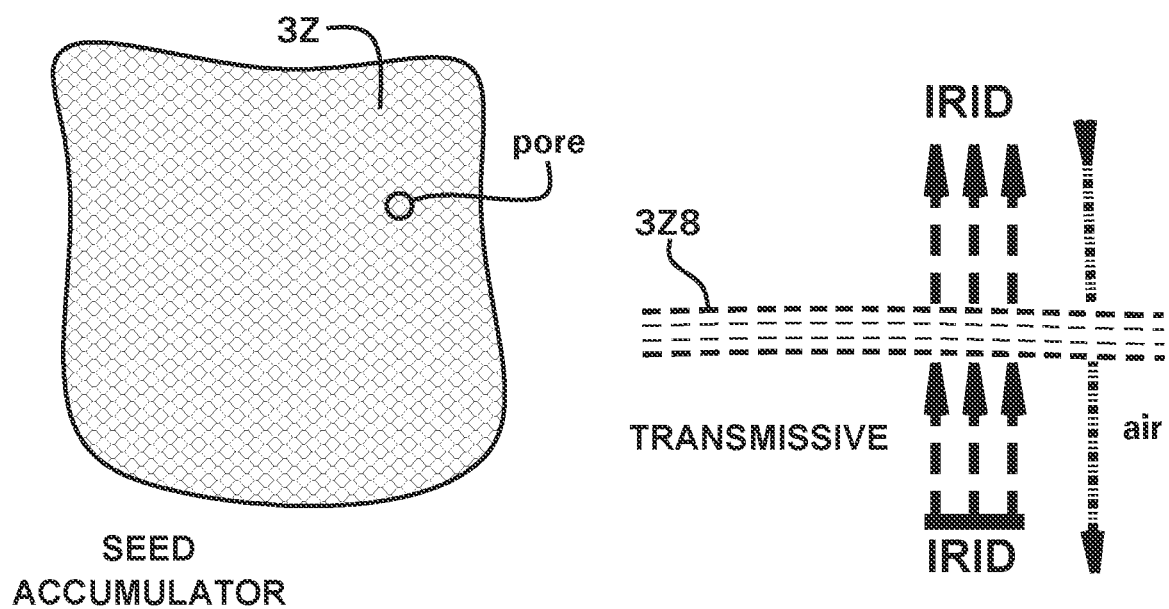
Fig. 10
Fig. 11

DISCOVERED IRRADIANCES THAT ENGAGE
INNATE STIMULATIVE EXPOSURE RESPONSE

PROXIMITY PASS-THROUGH
CONFIGURATION
ILLUMINATOR

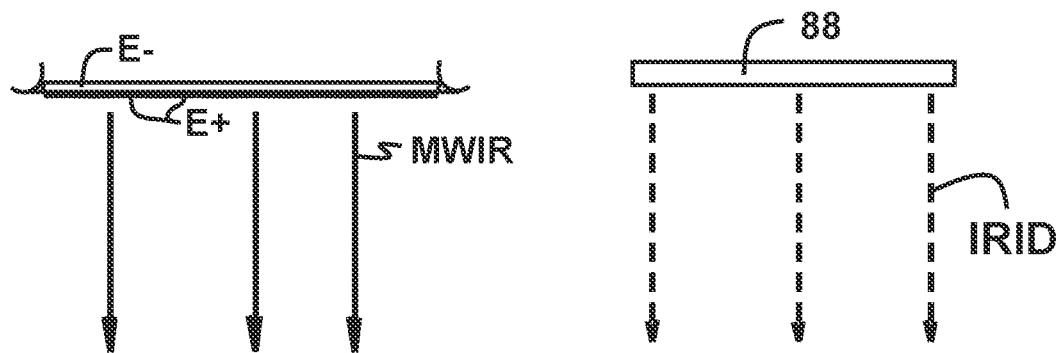
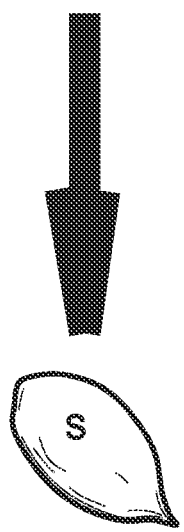
Fig. 28
PREFERRED EMBODIMENT

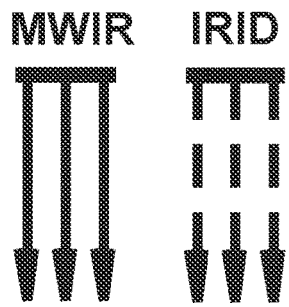
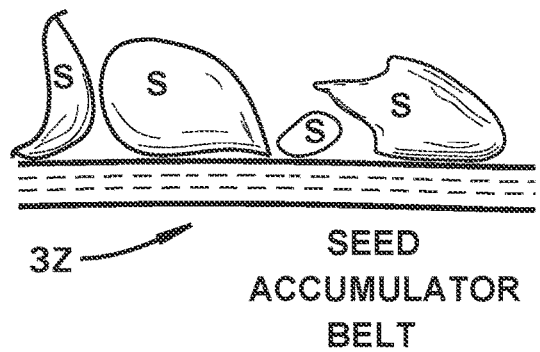
PREFERRED EMBODIMENT
DIRECT ILLUMINATION
*Fig. 35*
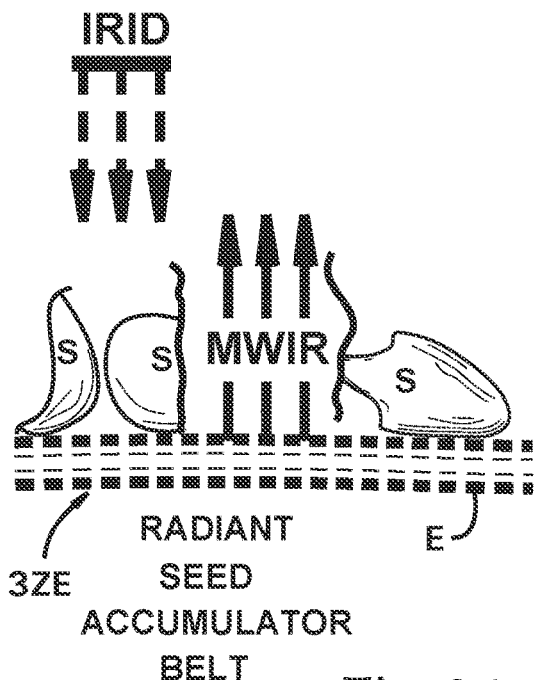
*Fig. 36*
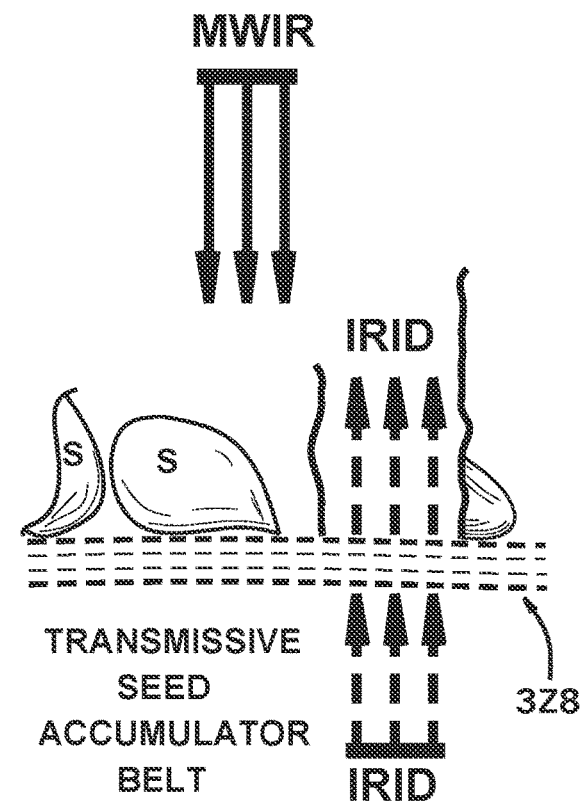
*Fig. 37*

RADIANT and TRANSMISSIVE SEED ACCUMULATOR BELT

RADIANT and TRANSMISSIVE SEED ACCUMULATOR BELT

RADIANT and TRANSMISSIVE SEED ACCUMULATOR BELT with TRANSMITTING LINKS

RADIANT and TRANSMISSIVE SEED ACCUMULATOR BELT with TRANSMITTING LINKS

COMPACT ILLUMINATOR

COMPACT ILLUMINATOR

Key: IRID ·········
MWIR ———

EXTERNAL WRAP RADIANT and TRANSMISSIVE SEED ACCUMULATOR BELT

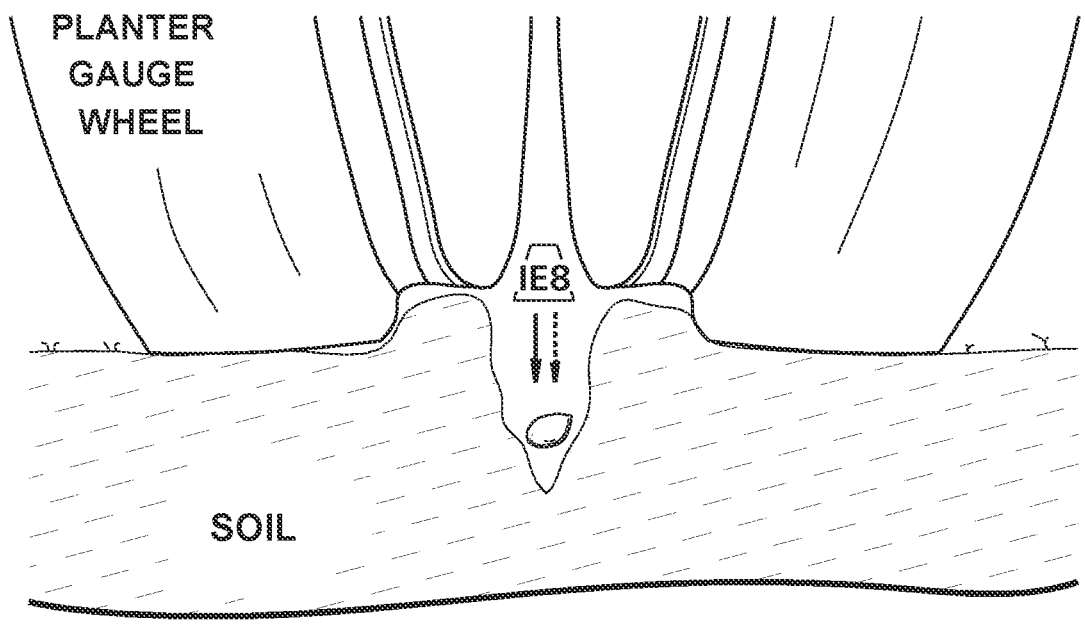
ILLUMINATED at DEPOSITION  *Fig. 56*
ILLUMINATED PLANTER
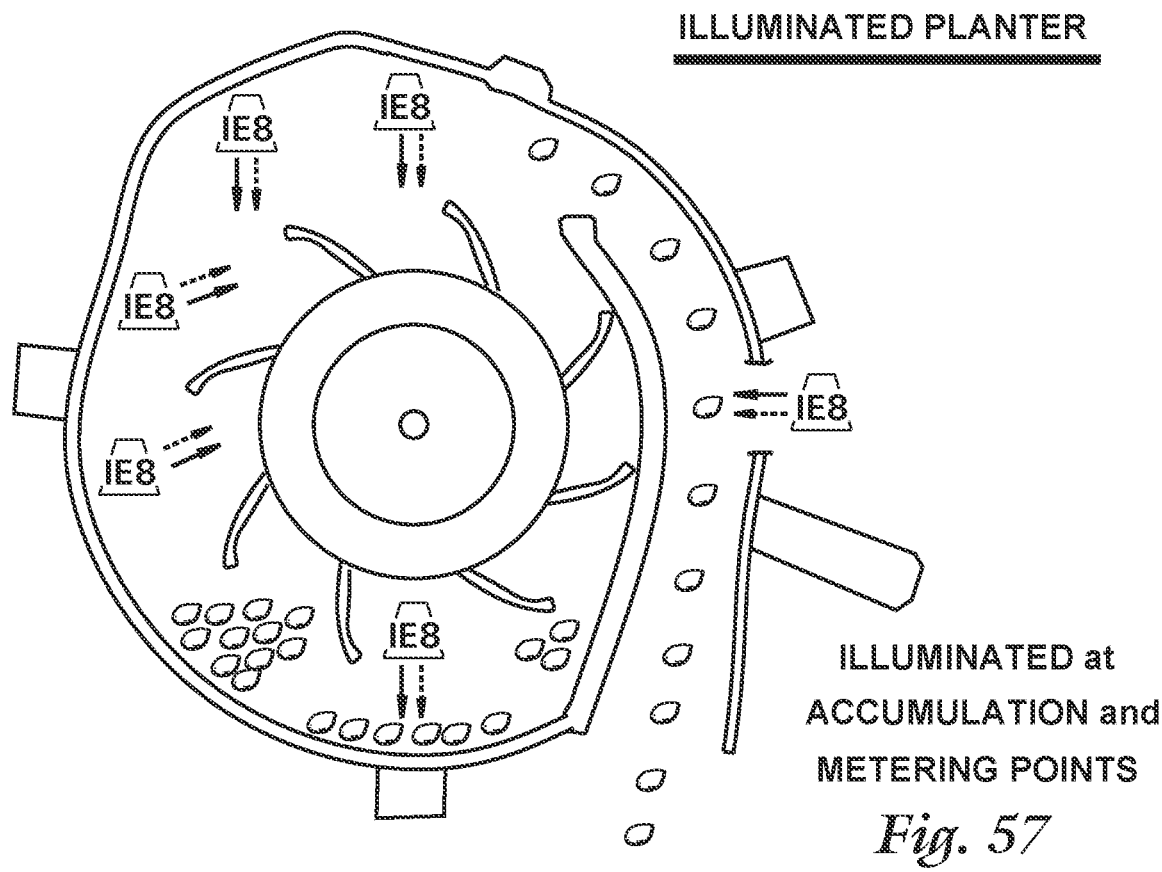
ILLUMINATED at ACCUMULATION and METERING POINTS
*Fig. 57*

RAPID PULSE PROGRAMMING OF SEEDS USING UNNATURAL LIGHT EXPOSURE

CROSS-REFERENCE TO RELATED APPLICATION

This application claims the benefit of U.S. Provisional Patent Application No. 63/256,862, filed 18 Oct. 2021, which is incorporated by reference herein in its entirety.

TECHNICAL FIELD

This invention relates to a new discovery involving what appears to be rapid pulse programming of seeds using unnatural light exposure which appears to act substantially upon seeds to improve germination probability and timing, and to increase root mass and crop yield.

The discovery involves engaging a rapid narrow range, irradiance-sensitive and cumulative energy-sensitive stimulative electromagnetic radiation exposure response in seeds.

The invention does not involve open-ended or long-term exposure such as upon land or any floor or table such as in a greenhouse or grow house. The exposure is rapid and intense for a limited time, typically on the order of seconds. The invention does not use very high radiative energy transfers in any energy or wavelength, or scalding, heat shock, incineration, seed cooking or the like, and has a minimum irradiance which is high relative to grow lamps and luminaires.

BACKGROUND OF THE INVENTION

Agriculture and food industries represent approximately $1 trillion of U.S. GDP (Gross Domestic Product), much of it direct output from over 2 million farms on nearly 900 million acres of land. Modern farming has become a highly-intensive endeavor involving large relative amounts of financial investment and risk, use of complex and expensive equipment, skill and mastery over complex farming techniques and operations, and acutely focused attention to, and knowledge of, crop and animal biology; environments created by weather, effects of soil and decomposing biological matter, and many varied actions of competing plants, animals and microorganisms.

In agricultural grain production, desirable yield known generally as cash crops or grains can include small seed grains, like alfalfa, canola, flax, grass seeds, millet, mustard, oats, rape seed, rice, rye and triicale; medium-size seeds, like barley, lentils, popcorn, safflower, sorghum, and wheat; and large seeds, like chickpeas, corn, edible beans, lupins, navy beans, peas, soybeans and sunflowers. The progress and extent of seed germination, and later establishment of root mass are important for crop yields and for profitable and viable farm operations worldwide.

Benefits of Increased Germination Rates in Agriculture Include:
  [a] reduced seeding costs of major agricultural crops
  [b] increased stand density (plants per linear foot or acre or square meter) which helps to combat weed pressure and ultimately increase yields, and
  [c] greater crop uniformity, meaning fewer gaps for weeds to establish and higher yields.

Benefits of Increased Germination Speed in Agriculture Include
  [1] quicker stand establishment, which provides canopy sooner to compete against weeds;
  [2] faster establishment of hardy seedlings, which reduces risk of dieback from light freezes for early season plantings, and
  [3] faster crop establishment, which combats shortening and unpredictable length growing seasons.

Benefits of increased root mass in agriculture include greater intake of nutrients and water leading to a crop that is more resilient to stresses and more competitive against weeds, and a crop that will ultimately grow bigger, providing higher yield.

Now referring to FIG. 1, a schematic representation of a general electromagnetic spectrum for wavelengths of radiation of significance that are potentially incident upon a plant, with wavelengths ranging from 1 mm to less than 100 nm, is shown. In the infrared portion, or heat radiation portion of the electromagnetic spectrum, there are subdivisions for Far-Infrared (FAR), mid or Medium Wavelength Infrared (MWIR) and near-infrared (NEAR) all in total ranging from 1 mm to 700 nm or 0.7 microns. Visible light (Visible Light) is commonly taken to range from 700 nm to 400 nm. Ultraviolet (Ultraviolet) radiation is generally taken to be of wavelength less than 400 nm, with near-ultraviolet further divided according to some consensus into known portions UV-A (400-320 nm), UV-B (320-280 nm) and finally, UV-C (280 nm-100 nm) which is extremely dangerous for humans and is often used as a germicidal radiation to purify water and kill bacteria, viruses, and other organisms.

There are competing standards for labeling portions of the electromagnetic spectrum, as promulgated by ISO (International Organization for Standardization); DIN (Deutsches Institut für Normung e.V). (German Institute for Standardization) and others.

It is important to note that in this disclosure and the appended claims, these and certain other subdivisions shall have particular meanings assigned here and will be defined herein in the Definitions Section.

Now referring to FIG. 2, a cartesian plot of both unfiltered solar radiation and net (ground) solar radiation is shown, with spectral radiance in watts per square meter per nanometer versus wavelength in nanometers (nm) is shown. Photosynthesis in plants makes use of visible light, especially blue and red visible light, and ultraviolet light, to varying degrees, depending on a host of factors including plant species and type, radiation exposure history, chloroplast type, internal plant signaling, light exposure history, and other factors. Note that nearly all the natural infrared radiation in sunlight is essentially in the region in or about near infrared (NIR), with wavelength shorter than 2 micrometers. This is in contrast to the unnatural illumination taught and claimed in the instant disclosure.

Approximately seven percent of the raw electromagnetic radiation emitted from the sun is in a UV range of about 200-400 nm wavelengths. As the solar radiation passes through the atmosphere, ultraviolet or UV radiation flux is reduced, allowing that UV-C ("shortwave") radiation (200-280 nm) is completely absorbed by atmospheric gases, while much of the UV-B radiation (280-320 nm) is additionally absorbed by stratospheric ozone, with a small amount transmitted to the Earth's surface. Solar UV-A radiation (320-400 nm) is essentially, for practical purposes, not absorbed by the ozone layer.

Prior art grow lamps, luminaires and radiation treatments do not teach specifically engaging and causing the irradiance-sensitive and energy-sensitive hidden stimulative exposure response in a seed within said narrow specific range of cumulative illumination energy as disclosed and claimed herein, and also do not teach avoiding illumination of higher cumulative illumination energy that would cause a different and destructive exposure response in a seed. Prior art references that teach the use of sterilizing radiations to eliminate fungus and pathogens do not exploit the stimulative exposure response discovered by the applicants. The use of high cumulative illumination energies, or the use of ionizing radiation as found in U.S. patent application Publication 20180255710 to Urban et al. — to provide sterilization of seed outer coats has been discredited in agriculture, and the trend presently is to keep bacteria on seed coats, and for farmers to put inoculants on seeds. Seed inoculation benefits seeds and the *Rhizobium* bacteria on the seed coat, which promotes nitrogen fixing bacteria. U.S. Pat. No. 2,300,727 to Durling is a topical anti-fungal illumination method with required turning over of seeds for best results, and despite inconsistencies in the specification and claims, his cumulative energy levels applied are high, with his stated success using 20 second exposures are high, extending into a destructive operating regime and proving that the benefit he claims is from its anti-fungal effects and that he did not discover the irradiance-sensitive and energy-sensitive hidden stimulative exposure response in a seed taught and claimed by the applicant.

SUMMARY OF THE INVENTION

A method for rapid pulse programming of a seed, to obtain at least one of improved germination probability, increased root mass, and increased crop yield was discovered, in that direct illumination of a seed within a range of irradiances in $W/cm^2$ and within a narrow range of cumulative energies in $Joules/cm^2$ reveals the existence of an irradiance-sensitive and energy-sensitive hidden stimulative exposure response in the seed.

The invention comprises a method for rapid pulse programming of a seed, to obtain at least one of improved germination probability, increased root mass, and increased crop yield, wherein the method comprises:

illuminating the seed with electromagnetic radiation of a wavelength distribution ranging from 300 nm to 20 microns, and the illuminating so formed and arrayed and timed to illuminate the seed with a minimum average irradiance of 0.2 Watts/cm² and a maximum average irradiance of 7 Watts/cm², and also having a narrow specific range of cumulative illumination energy from ½ Joule/cm², to one of 3 Joules/cm² and a transition point cumulative illumination energy $E_{max}$ Joules/cm², so as to specifically engage and cause an irradiance-sensitive and energy-sensitive hidden stimulative exposure response in the seed within the narrow specific range of cumulative illumination energy, and so as to avoid illumination of higher cumulative illumination energy that would cause a different and destructive exposure response in the seed.

The narrow specific range of cumulative illumination energy can be one of: ½ Joule/cm² to 4 Joules/cm²; ½ Joule/cm² to 5 Joules/cm²; ½ Joule/cm² to 6 Joules/cm²; ½ Joule/cm² to 7 Joules/cm²; ½ Joule/cm² to 8 Joules/cm²; ½ Joule/cm² to 9 Joules/cm²; ½ Joule/cm² to 10 Joules/cm²; ½ Joule/cm² to 11 Joules/cm²; ½ Joule/cm² to 12 Joules/cm²; ½ Joule/cm² to 13 Joules/cm²; ½ Joule/cm² to 14 Joules/cm²; and ⅔ Joule/cm² to 15 Joules/cm², and the minimum average irradiance can be selected from any of 0.3 W/cm², 0.4 W/cm², 0.5 W/cm², 0.6 W/cm², 0.7 W/cm², 0.8 W/cm², 0.9 W/cm², and 1.0 W/cm², 2.0 W/cm², 3.0 W/cm², 4.0 W/cm², 5.0 W/cm², and 6.0 W/cm².

The wavelength distribution can comprise at least one of Medium Wavelength Infrared (MWIR) radiation and an Indigo Region Illumination Distribution (IRID), and also the wavelength distribution of the illuminating can comprise both Medium Wavelength Infrared (MWIR) radiation and an Indigo Region Illumination Distribution (IRID).

The illuminating can comprise a minimum average irradiance of at least one of 4/10 Watt/cm² of Medium Wavelength Infrared (MWIR) and 7/100 Watts/cm² of an Indigo Region Illumination Distribution (IRID).

The rapid pulse programming of the seed can be preceded by a warmup illumination comprising illuminating the seed with electromagnetic radiation of a wavelength distribution ranging from 300 nm to 20 microns with a with a minimum average irradiance of 0.2 Watts/cm² for a total cumulative illumination energy of less than ½ Joule/cm², and the warmup illumination can comprise Medium Wavelength Infrared (MWIR) radiation.

During the illuminating, the seed can be at least one of: under control by an agricultural planter process, under control by seed metering in an agricultural process, and being deposited by an agricultural planter process; and wherein the agricultural planter process is so operated for at least one of metering and deposition of the seed. During the agricultural planter process, the illuminating can be arrayed, positioned, operated, deployed, and energized to illuminate the seed in the agricultural planter process in at least one of a hopper storage point, a transfer point, a seed accumulation point, a seed metering point, a soil opening point, a soil closing point, and a seed deposition point of the agricultural planter process.

The seed can be transported to and from a processing theater that comprises a seed accumulator. Transporting the seed to and from the processing theater can comprise transporting the seed to and from a seed accumulator belt (3Z, 3ZE, 3Z8, 3ZE8).

Transporting the seed to and from the processing theater can comprise transporting the seed to and from a transmissive seed accumulator belt (3Z8), and wherein at least a portion of the illuminating the seed comprises passing at least some Indigo Region Illumination Distribution radiation through the transmissive seed accumulator belt.

Transporting the seed to and from the processing theater can comprise transporting the seed to and from a radiant seed accumulator belt (3ZE), and wherein at least a portion of the illuminating the seed comprises generating at least some Medium Wavelength Infrared (MWIR) radiation from heating of, and thermal emission from, the radiant seed accumulator belt itself.

Transporting the seed to and from the processing theater can comprise transporting the seed to and from a radiant and transmissive seed accumulator belt (3Z8E), and wherein illuminating the seed comprises passing at least some of Indigo Region Illumination Distribution through the radiant and transmissive seed accumulator belt, and wherein illuminating the seed also comprises generating at least some of Medium Wavelength Infrared (MWIR) radiation from heating of, and thermal emission from, the radiant and transmissive seed accumulator belt itself.

Transporting the seed to and from the processing theater can comprises transporting the seed to and from a seed accumulator belt (3Z), and further comprises harvest handling by assembly and retention of the seed on a first portion of the seed accumulator belt, and expulsion of the seed from a second portion of the seed accumulator belt, by driving at least one of air flow and fluid flow through the belt, with the at least one of air flow and fluid flow so positioned to create a vacuum to assist in the assembly and retention at the first portion, and a positive pressure to assist in the expulsion at the second portion.

The seed can be in motion such that it is one of flying and falling in the processing theater, and the illuminating is so further formed and arrayed to provide illuminating during a time of flight (F) of the seeds.

The processing theater can be inside a combine harvester, and the transporting can comprise transporting the seed from a thresher of the combine harvester to the processing theater.

The processing theater can be inside a heated tube auger-fed exposure unit, so constructed, sized and operated to provide the illuminating internally to the seed, and the illuminating can comprise both Medium Wavelength Infrared radiation and Indigo Region Illumination Distribution radiation.

The invention comprises also an illuminated agricultural planter that allows rapid pulse programming of a seed, to obtain at least one of improved germination probability, increased root mass, and increased crop yield, wherein the illuminated agricultural planter comprises:
  [1] an agricultural planter so formed, sized, and operated for at least one of metering and deposition of the seed;
  [2] an illuminator so sized, positioned, operated, deployed, and energized to illuminate the seed in the agricultural planter in at least one of a hopper, a transfer point, a seed accumulation point, a seed metering point, a soil opening point, a soil closing point, and a seed deposition point of the agricultural planter;
with the illuminator further so sized, positioned, operated, deployed and energized to illuminate the seed with electromagnetic radiation of a wavelength distribution ranging from 300 nm to 20 microns, and the illuminating so formed and arrayed and timed to illuminate the seed with a minimum average irradiance of 0.2 Watts/cm$^2$ and a maximum average irradiance of 7 Watts/cm$^2$, and also having a narrow specific range of cumulative illumination energy from ½ Joule/cm$^2$, to one of 3 Joules/cm$^2$ and a transition point cumulative illumination energy $E_{max}$ Joules/cm$^2$, so as to specifically engage and cause an irradiance-sensitive and energy-sensitive hidden stimulative exposure response in the seed within the narrow specific range of cumulative illumination energy, and so as to avoid illumination of higher cumulative illumination energy that would cause a different and destructive exposure response in the seed.

The invention comprises also a plurality of seeds having undergone rapid pulse programming to obtain at least one of improved germination probability, increased root mass, and increased crop yield, wherein the seeds have undergone illuminating with electromagnetic radiation of a wavelength distribution ranging from 300 nm to 20 microns, with the illuminating so formed and arrayed and timed to illuminate the seeds with a minimum average irradiance of 0.2 Watts/cm$^2$ and a maximum average irradiance of 7 Watts/cm$^2$, and also having a narrow specific range of cumulative illumination energy from ½ Joule/cm$^2$, to one of 3 Joules/cm$^2$ and a transition point cumulative illumination energy $E_{max}$ Joules/cm$^2$, so as to specifically engage and cause an irradiance-sensitive and energy-sensitive hidden stimulative exposure response in the seeds within the narrow specific range of cumulative illumination energy, and so as to avoid illumination of higher cumulative illumination energy that would cause a different and destructive exposure response in the seeds.

BRIEF DESCRIPTION OF THE DRAWINGS

FIG. 3 shows a part surface view, part oblique cutout view of major components of an illustrative agricultural seed;

FIG. 4 shows a cross-sectional view of certain illustrative components of a dicot;

FIG. 5 shows a basic view of a seed after germination and emergence of a radicle;

FIG. 6 shows the schematic representation of a general electromagnetic spectrum for wavelengths incident from the sun of FIG. 1, with a total maximum irradiance of approximately 0.1 W/cm$^2$;

FIG. 9 shows a schematic representation of the method according to the invention to engage a later innate stimulative response in a seed;

FIG. 10 shows an illustrative seed accumulator belt that comprises pores or the like;

FIG. 11 shows a transmissive seed accumulator belt for use in a processing theater according to the invention;

FIG. 28 shows a schematic depicting separate MWIR and IRID sources to irradiate a seed according to the invention;

FIG. 35 shows a cross-sectional schematic of a harvest Q of seeds under direct illumination to receive a preferred illumination atop a seed accumulator belt 3Z;

FIG. 36 shows a cross-sectional schematic similar to that of FIG. 35, but using a radiant seed accumulator belt;

FIG. 37 shows a cross-sectional schematic similar to that of FIG. 36, but using a transmissive seed accumulator belt;

FIG. 56 shows a close-up of the schematic cross-sectional view of FIG. 55, showing illumination at the deposition point of the agricultural planter according to the invention;

FIG. 57 shows the cross-sectional schematic view of metering and accumulation points in the agricultural planter of FIG. 54, with possible illuminators shown according to the invention;

DEFINITIONS

Figure 1:
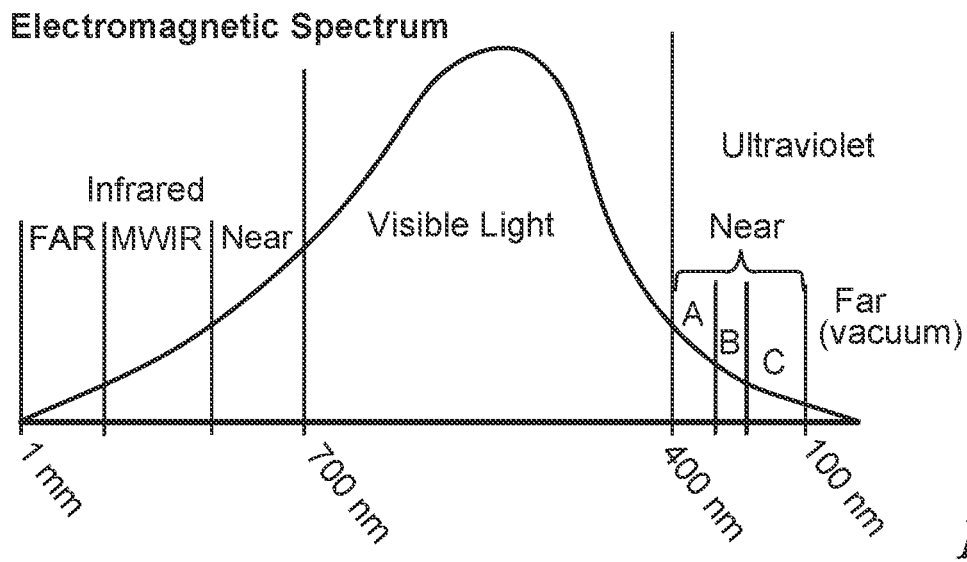
FIG. 1 shows a schematic representation of a general electromagnetic spectrum for wavelengths potentially incident from the sun, with wavelengths ranging from 1 mm to less than 100 nm.
Figure 2:
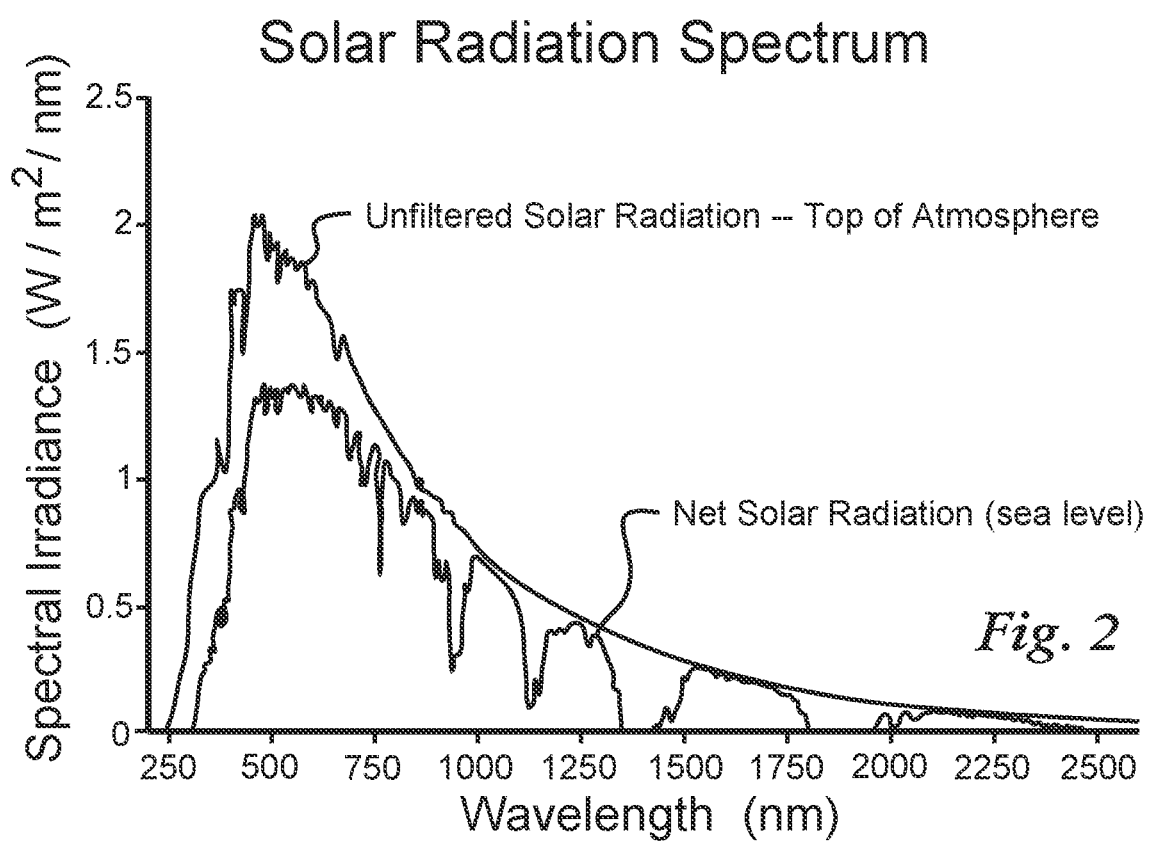
FIG. 2 shows a typical natural filtered and unfiltered solar radiation spectrum using a cartesian plot of spectral radiance versus wavelength.

The following definitions shall be used throughout:

Auger—shall include any helical component that effects movement of material, and any component that accomplishes the same function. A spiral-shaped component is not necessary and nor is a spiral path.

Belt—shall include any structure or material body that can serve as a web, conveyor, or transporter to facilitate illumination according to the invention. A belt that forms a processing theater can serve as a seed accumulator as defined here, and can itself also act as a radiator or transmitter of electromagnetic radiation as taught and claimed in the instant disclosure.

Combine—shall be any machine that reaps, threshes and separates a harvest, as defined herein.

Directed, directing—shall denote any net transmission of electromagnetic radiation as taught and claimed here, whether by direct illumination or via reflection or indirect transmission, such as via use of mirrors, light guides, via refraction, or incidental reflection or absorption and re-transmission through any material body, or through a chaff under treatment, or a seed adjacent to a seed under treatment, such as light passing between or through one or more seeds to another seed.

Exposure—shall denote a process of illumination that shall include stepwise, piecemeal, segmented, separated, sequential, variable, or modulated exposures that when totaled, have a summed duration or the equivalent of well under one minute, such as three 5-second exposures/flashes over a three minute time, or four ¼ second flashes in one hour.

Field—shall include any agricultural surface, whether outside or inside a greenhouse or growing facility, and also any surface or place upon which the instant invention is practiced.

Germination viability—in this disclosure shall can be expressed as, and shall denote, unless otherwise stated, the percentage of seeds capable of later producing growing plants for a given set of environmental conditions.

Harvest—shall denote any agricultural product or biological material treated using the teachings of the invention, such as a harvest on a field or any reaping of live plants, whether considered a foodstuff or not; and also any biological product or material arrayed for treatment according to the instant invention. Harvest, as defined here, shall also include any agricultural product or crops or plants that have been reaped, cut, rolled, burned, tamped, shredded, or otherwise manipulated or treated by means other than by use of the instant invention.

Heater/Heating—shall include all thermal production and transfer, from any heat source, via contact or conduction; convection; or radiation, or resonance.

Illumination—shall be interpreted broadly and shall include all manner of radiative processes and exposures as defined by the appended claims, and shall not be limited to lamp outputs, but rather shall encompass any and all radiation afforded by physical processes such as incandescence or any light emission process such as from a light emitting diode (LED); flames; or incandescence from hot masses, such as gases, fluids, steam, metal knives or hot infrared emitters—and can encompass multiple sources. Lamps shown illustratively in this disclosure shall not be considered limiting, in view of the appended claims.

Illuminator—shall denote light sources as taught herein for practicing the instant invention.

IRID/Indigo Region Illumination Distribution—shall denote a preferred range of frequencies, such as emitted by commercially available blue LED (light emitting diode) light sources with emission peaks named "royal blue" that denote a possible range of wavelengths that serve the instant invention. This definition shall include an Indigo Region Illumination Distribution to be defined to be any of the following wavelength ranges:

[1] A preferred range: 420-450 nm; [2] a larger preferred range of 420-480 nm; [3] a larger preferred range of 400-500 nm; [4] a yet larger preferred range of 400-550 nm; [5] and a broad range of 300-550 nm. This "indigo band" does not have to include indigo or blue or any particular "color" and does not have to include wavelengths in the preferred range of—wavelengths of 420-450 nm that are commonly assigned to indigo or near indigo as human perceptions. The addition of light for any reason, including for a trademark or appearance effect, e.g., aquamarine, shall not affect this definition. An Indigo Region Illumination Distribution IRID can include monochromatic, multi-chromatic frequency/wavelength lines or bands, continuous or non-continuous distributions, and distributions that comprise one of more emission lines, or distributions that are absent the general wavelength or frequency for which it is named, i.e., a distribution that is absent wavelengths generally given for indigo, that is, absent approximately 420-450 nm. Metamerism and the response of the human visual system to identify or form color perceptions shall not narrow this definition.

IRID Emitter (88)—shall denote any light producing device that has the requisite electromagnetic output properties to help produce an Indigo Region Illumination Distribution IRID that allows service to the instant invention as described in the appended claims, and can be an LED array IRID emitter 88, a laser, or an excited material body. An IRID emitter and a MWIR emitter can be combined into one body or component, or device.

Medium Wavelength Infrared—MWIR—has been variously defined by different international organizational bodies, sometimes using different terms. For example In the CIE division scheme (International Commission on Illumination), CIE recommended the division of infrared radiation into the following three bands using letter abbreviations: IR-A, from 700 nm-1400 nm (0.7 µm-1.4 µm); IR-B, from 1400 nm-3000 nm (1.4 µm-3 µm); and IR-C from 3000 nm-1 mm (3 µm-1000 µm). ISO (International Organization for Standardization) established a standard, ISO20473 that defines the term mid-IR to mean radiation with wavelengths from 3-50 microns. In common literature infrared generally has been divided into near infrared (0.7 to 1.4 microns IRA, IR-A DIN), short wavelength infrared (SWIR or 1.4-3.0 microns IR-B DIN), mid-wavelength (or medium wavelength) infrared at 3-8 microns (MWIR or mid IR 3-8 microns IR-C DIN) to long wavelength infrared (LWIR, IR-C DIN) 8-15 microns to far infrared 15-1000 microns. In this disclosure, throughout the specification, drawings and in the appended claims, MWIR in particular shall have a meaning assigned, and the wavelengths for MWIR shall span from 2-20 microns, and with preferred embodiments in a range of 2-8 microns and sometimes more preferably in a range of 2-5 microns. Source emissions can include emissions from an MWIR emitter E that is formed from materials with known emissivity functions useful in service of the invention, such as known borosilicate glass.

MWIR Emitter (E)—shall denote any glass or material body that has the requisite optical properties or electromagnetic emissivity properties that allow service to the instant invention as described in the appended claims. This can include glass known under the trade name Pyrex® such as borosilicate glass, which is preferred, or Pyrex Glass Code 7740, as well as Pyrex® soda lime glass or other materials, such as aluminum oxide ceramic. Any material body which serves the invention with useful emissivity as an MWIR emitter when stimulated, excited, or heated shall meet this definition. An IRID emitter and a MWIR emitter can be combined into one body or component.

Motion/in motion—shall include all generally moving states of a harvest, including [1] continuous motion; [2] stepwise motion that can include pauses, starts and stops, or even has reversals—in any combination; and motion induced by vibratory elements or supports that cause a harvest to generally progress, but not always progress, in space Planter/Planter Process—shall denote any implement, machine or process which performs or helps perform the act of storing seeds, or depositing or sowing seeds, such as in rows throughout an agricultural field. A planter shall include all components used, such any storage bin, hopper, seed distribution tower, transfer hoses and mechanisms, accumulators, metering components, and deposition components for sowing into soil. A planter shall also include any seed drill or lister.

Powder coat—shall include any and all coverings, coatings, surface treatments, appliques, and depositions to a surface, including using materials as disclosed, such as borosilicate glass, Pyrex® Glass Code 7740, soda lime glass, aluminum oxide ceramic.

Process/method—such as referred to in the instant disclosure and appended claims, including referring to a processing theater, can be a process as taught herein that is continuous in time, or non-continuous, including piecewise, piecemeal, stepped, interrupted or delayed application of the methods of the instant invention, and shall also refer to any process for which at least portion of which occurs in real time.

Processing theater—shall comprise any physical area, surface or land surface, belt, auger, conveyor, panel, web, screen, mesh, volume or space which facilitates, provides for, or allows illumination according to the instant invention and as described in the specification and appended claims, including any wind tunneling region, auger passage, sorting area, staging area, table, accumulator or harvest flow manifold used for processing of a harvest. In this sense, a processing theater can, but does not have to, include a mechanical or physical belt. It can instead comprise an transport area, region, structure, or material body where sorting, collecting, threshing, reaping, parking, consolidating, separating, resting, or landing of a harvest or processing product treatable by the instant invention occurs. The processing theater can also be situated upon, or proximate to, any field as defined in this disclosure.

Seed—shall include all known seeds, such as outcrossed, inbred, or hybrid seeds; and any embryonic plants, or encased plant embryos; agricultural products; and any other biological material susceptible to, or treatable using the instant invention in the manner disclosed in the specification and appended claims.

Seed accumulator—shall include any belt, structure, material body or space that can serve to mechanically retain, support, or transport seeds, that forms a processing theater as defined in this section and throughout this disclosure illustratively. Seeds can be in motion across, upon or through a seed accumulator and can be retained by same in continuous, intermittent, paused or varied motion. It is contemplated that an air pressure differential or an air flow can help seeds be retained or supported by, and later expelled by, a seed accumulator.

Wavelength distribution—shall include any and all distributions, including continuous, spectral or other distributions of radiation in a given wavelength distribution range. For example, a wavelength distribution according to the claimed invention can comprise primarily only Medium Wavelength Infrared (MWIR) of wavelengths 2-8 microns, and Indigo Region Illumination Distribution (IRID) of wavelengths 350-500 nm.

DETAILED DESCRIPTION

Referring now to FIG. 3, a part surface view, part oblique cutout view of major components of an illustrative agricultural seed are shown. Seed S is shown comprising an endosperm (ENDOSPERM), a food store for a later developing plant embryo; a germ (GERM) or embryo of the seed; and an outer coat (COAT) which figures importantly in the exposures taught and claimed in this disclosure. Typical sizes for seed S range from 0.025 inch (0.6 mm) to 0.25 inches (6.4 mm).

Referring now to FIG. 4, a cross-sectional view of some illustrative components of a dicot (dicotyledon) are shown. A dicot is shown illustratively, possessing a radicle (RADICLE), which is typically the first part of the seed that emerges upon germination. As the embryonic root of the plant, it supports the hypocotyl (HYPOCOTYL) as shown, which essentially acts as an embryonic stem of the seed S that would emerge upon germination. Attached to this embryonic stem are two leaves as shown.

This disclosure relates to seeds of all types, among them monocotyledons and dicotyledons. Monocotyledons (associated with one seed leaf, not shown) and dicotyledons (associated with two seed leaves, shown attached to the radicle) differ in early seedling development. In monocotyledons, a primary root is protected by a coating, a coleorhiza, which ejects itself to yield to allow seedling leaves to appear, which are in turn protected by another coating, a coleoptile. With dicotyledons a primary root radicle grows, anchoring the seedling to the ground, and further growth of leaves occurs. Either way, germination is marked by the growth and development of the radicle, and allowing the full development of a healthy plant.

Referring now to FIG. 5, a basic view of a seed after germination and emergence of a radicle is shown. This is an elongation, as shown, of the embryonic axis from seed allowing subsequent seedling emergence.

Now referring to FIG. 6, a schematic representation of a general electromagnetic spectrum for wavelengths incident from the sun is shown. A typical figure for maximum solar power irradiance at the equator is 1000 Watts/meter$^2$ or 0.1 W/cm$^2$. This is significantly less than the minimum average irradiances and preferred irradiance taught and claimed in this disclosure.

Figure 7:
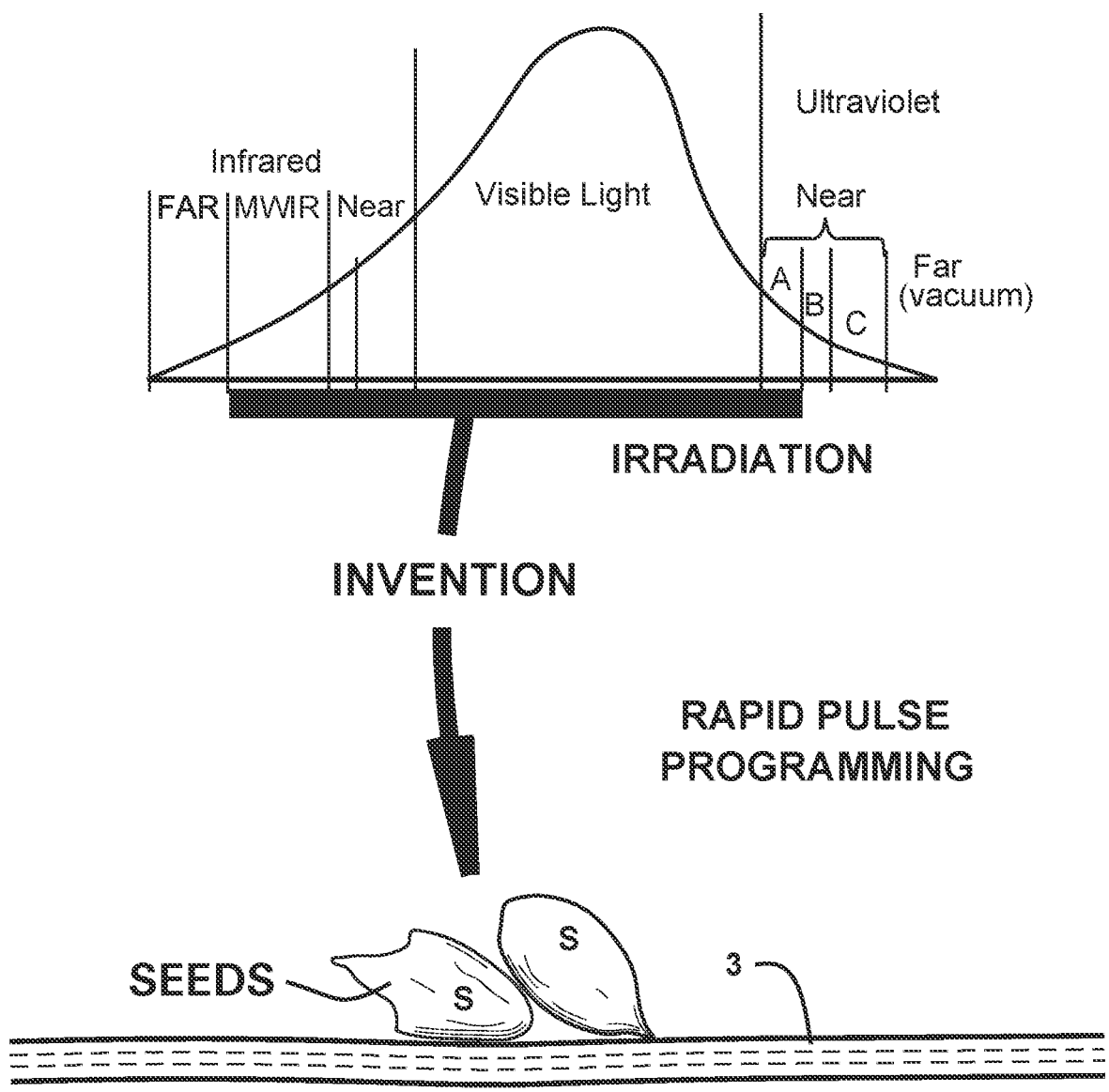
FIG. 7, shows a schematic representation of a method according to the invention employing rapid pulse programming of seeds using unnatural light exposure according to the invention.

Now referring to FIG. 7, a schematic representation of a method according to the invention is shown, employing rapid pulse programming of seeds using unnatural light exposure according to the invention. The illumination load is shown illustratively as impinging upon seeds S resting upon a belt as shown, but the seeds can rest upon any surface, such as a ground/earth plane or soil, a stainless steel pan or reflector bed, etc. This is shown as weed seed accumulator 3 shown underneath seeds S. Weed seed accumulator 3 can be or comprises a space, through which seeds pass for irradiation or illumination according to the invention, rather than a belt as shown. See Definitions Section. The pulse programming as taught and claimed in the instant disclosure was discovered to improve germination probability, and to increase root mass and crop yield.

Described very briefly and qualitatively, the method comprises programming said seed using said rapid pulse by delivering to the seed illumination of electromagnetic radiation of a wavelength ranging from 300 nm to 20 microns, and with the illumination so formed and arrayed and timed to deposit only a narrow specific preferred range of between ½ and 3 Joules/cm$^2$ cumulative energy, but with a minimum average irradiance of 0.2 W/cm$^2$. The maximum cumulative energy can be higher, depending on species, although the 3 Joules/cm$^2$ is nearly universal. Though it is just a theory and is not meant to be limiting to this specification and appended claims, this appears to specifically engage and cause an irradiance-sensitive and energy-sensitive innate stimulative exposure response in the seed. The illumination is preferably tailored to avoid deposition of higher than 3 Joules/cm$^2$ so as to avoid causing a different innate destructive exposure response, reduced germination viability, in the seed at higher deposited energy. So the illumination of the method is not sufficient to induce a change of state of the seed to having reduced germination viability; and nor is it sufficient to cause substantial high temperature burn of the seed.

As will be discussed below, one preferred illumination embodiment calls for an Indigo Region Illumination Distribution containing substantially wavelengths ranging from 300 to 550 nm, preferably 400 to 500 nm; and also Medium Wavelength Infrared radiation substantially composed of 2 to 20 micron wavelength radiation, preferably 2 to 8 microns. Preferred minimum average irradiance to engage the irradiance-sensitive and energy-sensitive innate stimulative exposure response in the seed can be 0.3 W/cm$^2$, 0.4 W/cm$^2$, 0.5 W/cm$^2$, 0.6 W/cm$^2$, 0.7 W/cm$^2$, 0.8 W/cm$^2$, 0.9 W/cm$^2$, 1.0 W/cm$^2$, 2.0 W/cm$^2$, 3.0 W/cm$^2$, 4.0 W/cm$^2$, 5.0 W/cm$^2$, or 6.0 W/cm$^2$. The narrow specific range of cumulative illumination energy can be one of: ½ Joule/cm$^2$ to 4 Joules/cm$^2$; ½ Joule/cm$^2$ to 5 Joules/cm$^2$; ½ Joule/cm$^2$ to 6

Joules/cm²; ½ Joule/cm² to 7 Joules/cm²; ½ Joule/cm² to 8 Joules/cm²; ½ Joule/cm² to 9 Joules/cm²; ½ Joule/cm² to 10 Joules/cm²; ½ Joule/cm² to 11 Joules/cm²; ½ Joule/cm² to 12 Joules/cm²; ½ Joule/cm² to 13 Joules/cm²; ½ Joule/cm² to 14 Joules/cm²; and ½ Joule/cm² to 15 Joules/cm². See the description for FIGS. 12-14.

Figure 8:
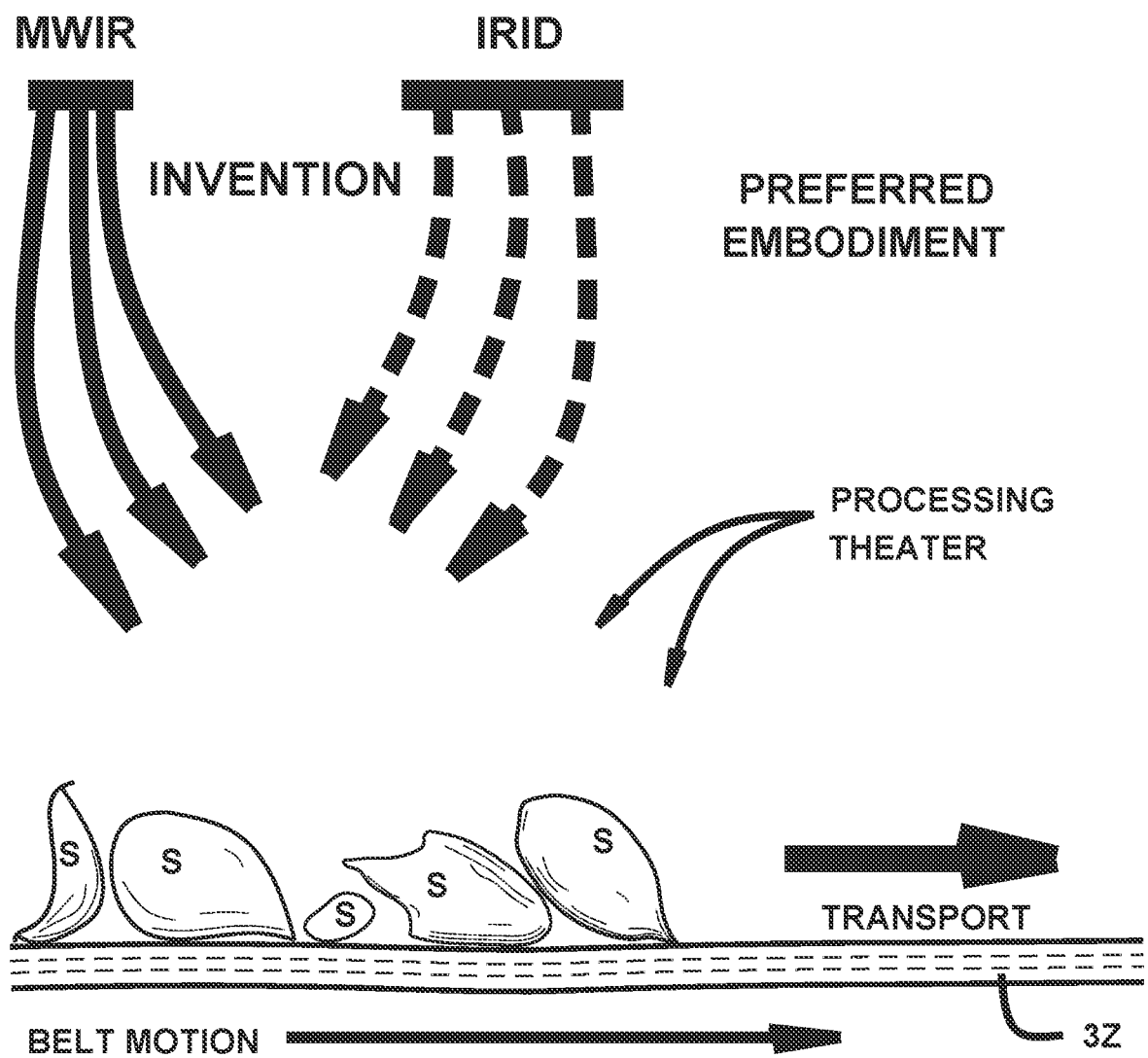
FIG. 8 shows incident rays for a preferred illumination comprising an Indigo Region Illumination Distribution and a Medium Wavelength Infrared Illumination Distribution aimed at a seeds under transport by a moving belt in a processing theater according to the invention.

Now referring to FIG. 8, incident rays for a preferred illumination are shown, comprising an Indigo Region Illumination Distribution and a Medium Wavelength Infrared Illumination Distribution aimed at a seeds under transport by a moving belt or seed accumulator 3Z in a processing theater according to the invention. This preferred method was discovered to provide quickly improved germination probability, increased root mass and higher crop yield. Seeds that have a protective coat fare well with Medium Wavelength Infrared exposure under the method of the invention. Seeds such as corn or soybeans or grass seeds, with little or protective coating, can use Indigo Region Illumination Distribution exposure to advantage. Using the instant teachings and appended claims, those of ordinary skill can determine what wavelength distributions are best. The illuminations taught here do not involve cooking or heating the cells that regulate growth, such as the radicle.

Now referring to FIG. 9, a schematic representation is shown of the method according to the invention to engage a later innate stimulative response in a seed. In the Figure, a seed S is shown undergoing illumination that sets up a seed for a later innate stimulative response, represented in the Figure by S+. The invention as taught and claimed here can be used as a supplemental treatment for seeds prior to packaging, containment, distribution, or planting.

Now referring to FIG. 10, an illustrative seed accumulator belt 3Z or mat that comprises pores or the like is shown. To establish a processing theater to practice the invention—and for materials handling, generally—such belts have proven useful. A plurality of pores (pore) as shown can act to retain seeds for the illumination, and the seed accumulator belt 3Z can allow passage of light and air. Ideal mat or belt thickness can be 3-6 mm (⅛" to ¼"), and for reasons given below, the belt itself can be formed from fiberglass, what amounts to Pyrex® glass to great advantage in increased efficacy for the invention itself. The fiberglass belt can be an important part of an illumination unit as described below to effect a change of state of seeds to having reduced germination viability.

Now referring to FIG. 11, a transmissive seed accumulator belt 3Z8 for use as a processing theater according to the invention is shown. The Pyrex® or fiberglass belt of FIG. 10 can be illuminated at the underside, allowing Indigo Region Illumination Distribution (IRID) light to pass through it and illuminate a load (seed) placed on top, as can be seen in Figures below. Air can also be passed through, for materials handling purposes, such as to attract and later expel a mat of seeds being treated.

Figure 12:
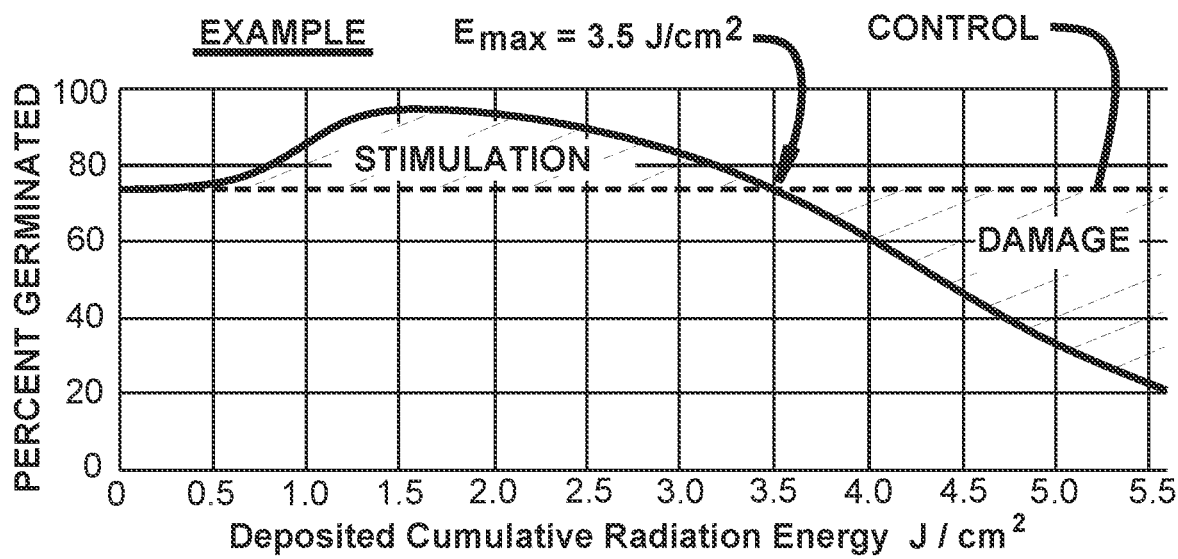
FIGS. 12, 13, and 14 show a discovery revealed by testing that is the subject of this disclosure, an Innate Stimulative Exposure Response of seeds to illumination as taught herein, showing a Cartesian plot of percent seed germination versus deposited radiation energy within a narrow range.
Figure 13:
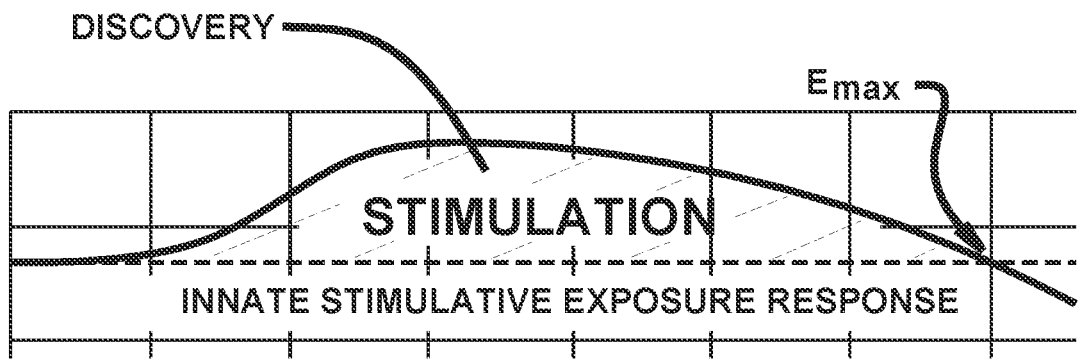
Figure 14:
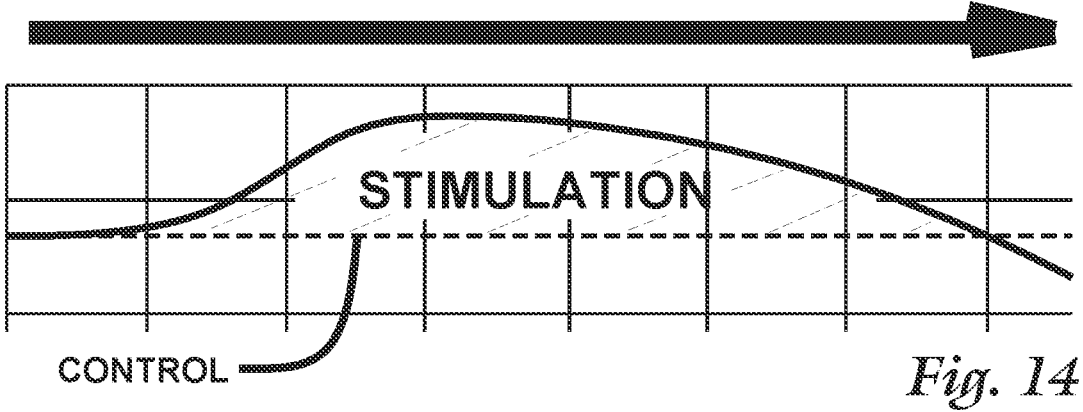
Figure 15:
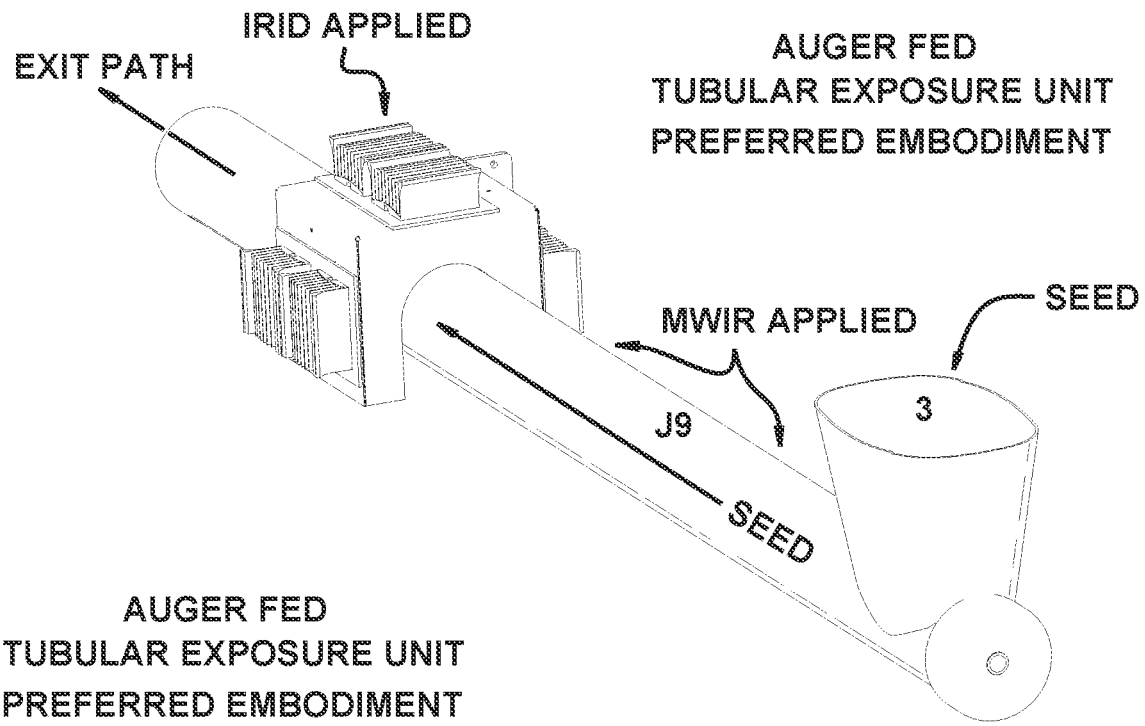
FIGS. 15-18 show auger fed tubular exposure unit according to the invention.
Figure 16:
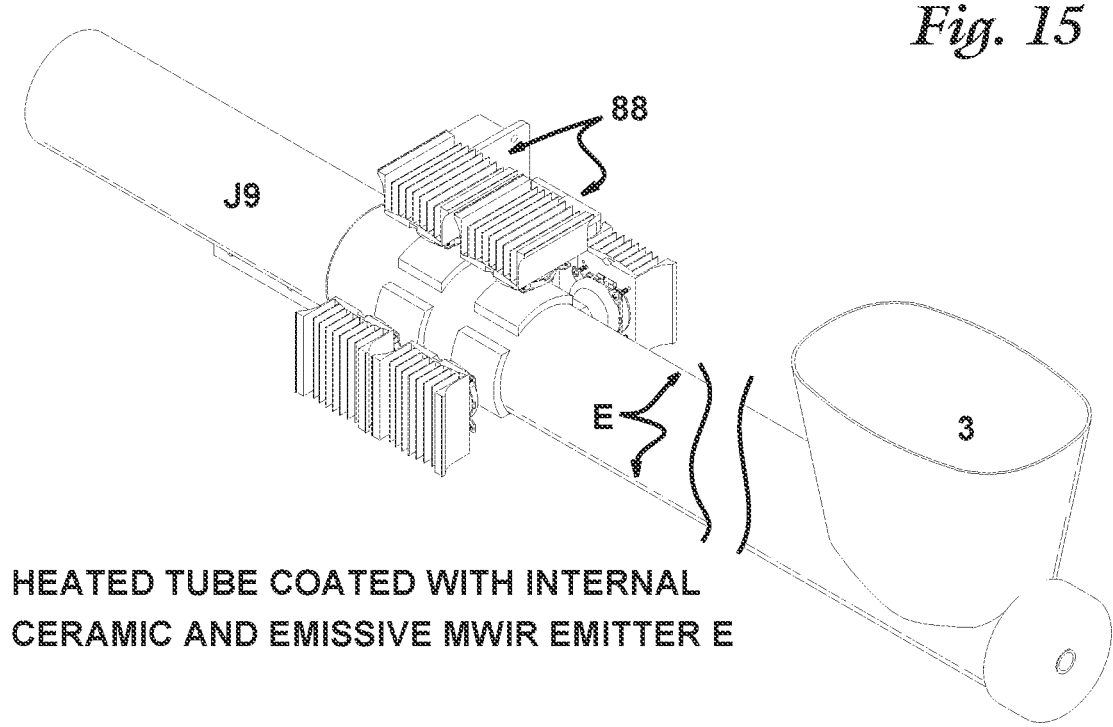
Figure 23:
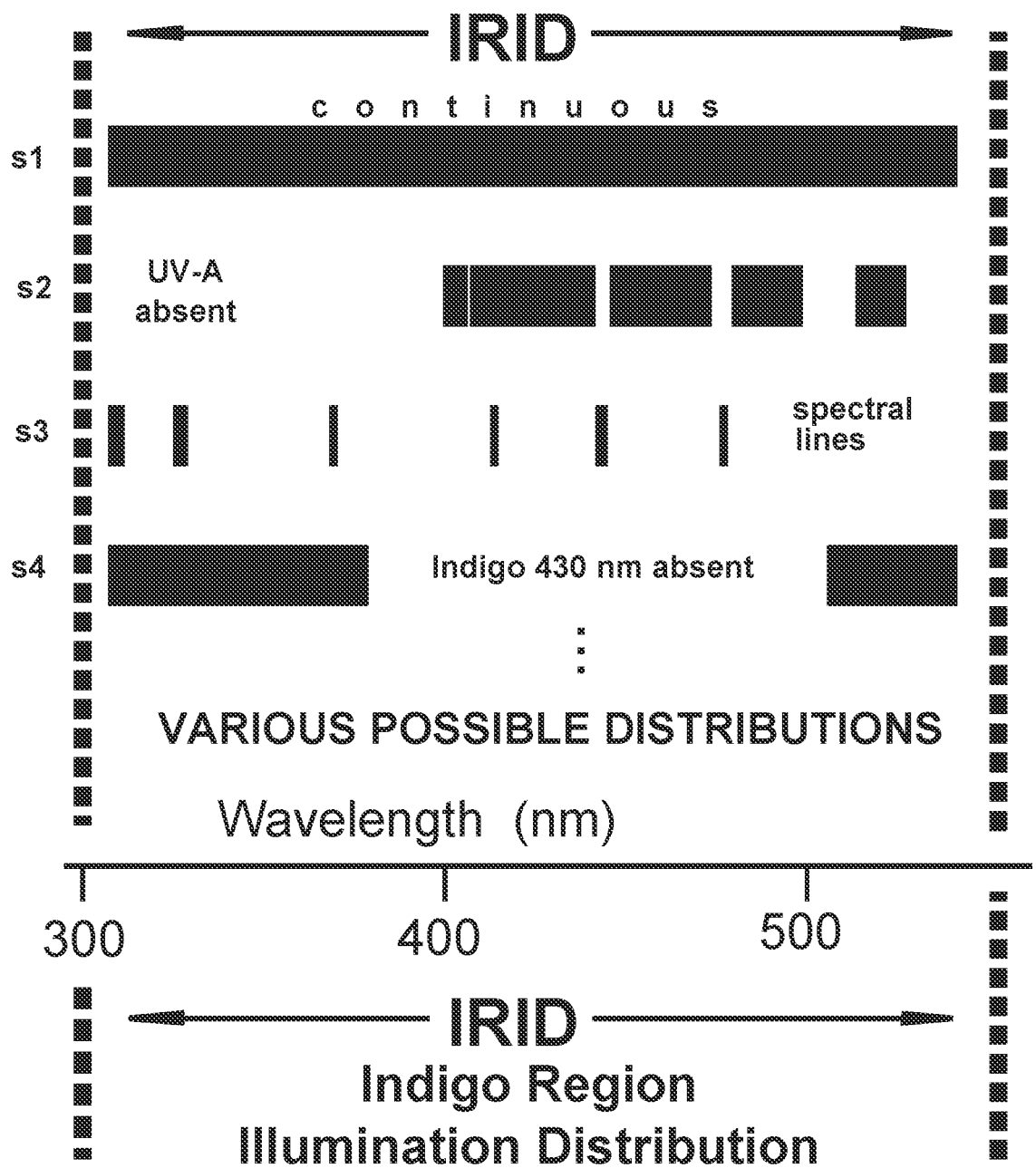
FIG. 23 shows a schematic representation across the range of 300 nm to 550 nm for an Indigo Region Illumination Distribution, with various illustrative possible distribution patterns.

FIGS. 12, 13, and 14 show a discovery revealed by testing that is the subject of this disclosure, a hidden and Innate Stimulative Exposure Response of seeds to illumination as taught herein. FIG. 12 shows an illustrative Cartesian plot of percent germination versus DEPOSITED CUMULATIVE RADIATION ENERGY J/CM² within a narrow range. In testing on dent corn seed (described below), successive illumination of electromagnetic radiation of under 3 seconds each using preferred Medium Wavelength Infrared and an Indigo Region Illumination Distribution (see Definitions section and description on IRID below, including FIG. 23) resulted in substantially higher germination rates in this EXAMPLE than an unexposed control group. Germination timing did not appear changed (e.g., made earlier). Also observed was an increase in root biomass, as 1 or 3 runs through the system resulted in large increases in root biomass, such as 33 percent larger.

Specifically, FIG. 12 shows that a control (CONTROL) group of seeds possessing a germination rate of 74 percent for zero deposited cumulative radiation energy in Joules/cm². As the illumination exceeds ½ Joules/cm², a discovered hidden stimulation regime or range (STIMULATION) is engaged. The phenomenon continues to cause an increase in germination rate which is shown illustratively for this trial to be peaking at about 94 percent germination at 1½ to 2 Joules/cm². The phenomenon continues until it tapers offer after 3 Joules/cm². Marked on the Figure is transition point cumulative illumination energy $E_{max}$ Joules/cm², where the percent germinated drops to that of the control group. This is where the irradiance-sensitive and energy-sensitive hidden stimulative exposure response in said seed disappears—and higher deposited cumulative radiation energy applied causes a different and destructive exposure response in said seed, resulting in a lowering of percent germinated, as clearly shown. Transition point cumulative illumination energy $E_{max}$ Joules/cm² can be determined empirically by those of ordinary skill using the instant teachings, and larger seeds such as tree nuts require higher deposited cumulative radiation energies. FIG. 13 shows a close-up of the plot of FIG. 12, highlighting the discovered regime or region marked, "STIMULATION" and marking it as an INNATE STIMULATIVE EXPOSURE RESPONSE. It is important to note that to get this phenomenon, this engagement of an irradiance-sensitive and energy-sensitive innate stimulative exposure response in the seed requires a minimum average irradiance of 0.2 W/cm² or higher, as depicted below in FIG. 20. The specificity of the deposited energy to certain (low) energies, namely ½ to 3 Joules/cm² and yet needing a minimum average irradiance, namely 0.2 W/cm² or higher makes this phenomenon not obvious to try and hard to detect. The effect appears to vary somewhat by plant species and the depiction of FIG. 12 is illustrative, and the exact value of $E_{max}$ can vary. It is important when practicing the invention that the illumination does not exceed the limits taught and claimed, so as not to pass into the DAMAGE regime as shown, which has been found to result in reduced germination viability.

Indeed, FIG. 14 indicates how prior art somewhat open-ended or somewhat open-ended continuous illumination such as sunlight on land, passes over the STIMULATION region, an irradiance-sensitive and energy-sensitive Innate Stimulative Exposure Response.

Figure 17:
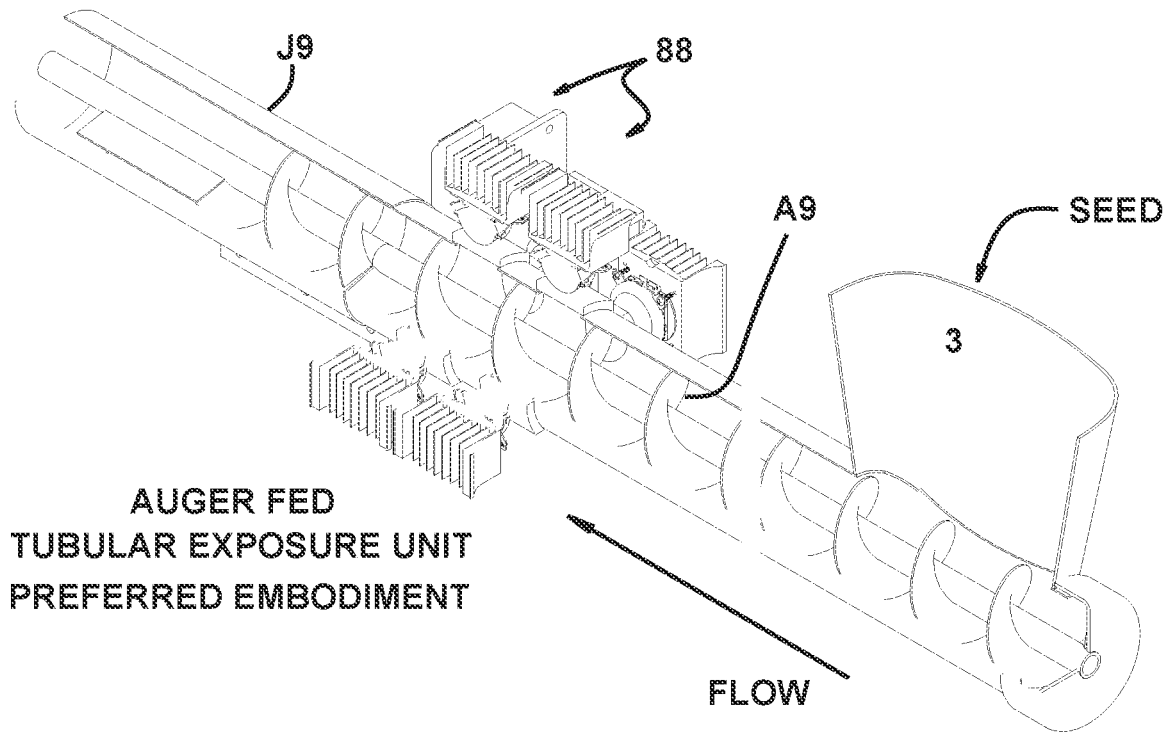
Figure 18:
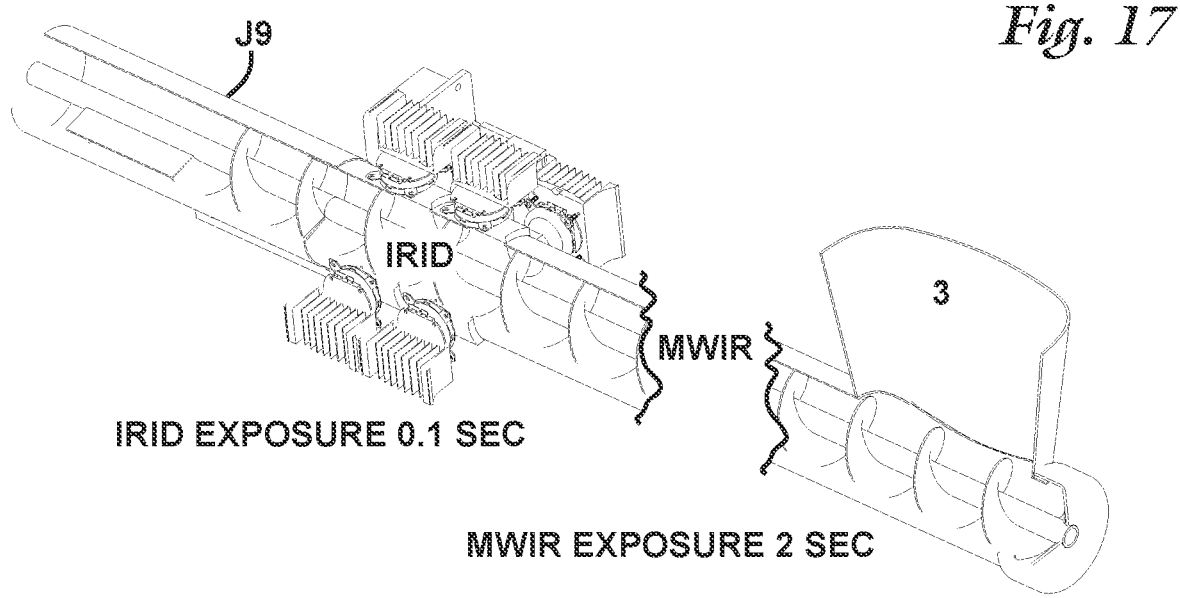

Now referring to FIGS. 15-18, an auger fed tubular exposure unit according to the invention is shown. FIGS. 17 and 18 show partial cut-outs of the views of FIGS. 15 and 16.

This is an auger-based conveyance system that can be used to pass seeds to deliver the high intensity short-term exposure of electromagnetic radiation required by the method of the instant invention. Although the electromagnetic radiation wavelength can range from 300 nm to 20 microns for the method, this is a preferred embodiment using Medium Wavelength Infrared and an Indigo Region Illumination Distribution. This AUGER FED TUBULAR EXPOSURE UNIT is a preferred embodiment which has demonstrated meaningful increases in crop seed germination rates, crop seed germination speed, and root mass after germination.

On the right side of the FIGS. 15-18 is a hopper 3 where seed or seeds (SEED) can be loaded into an exposure tube J9. Seed is conveyed leftward in the Figure through exposure tube J9 toward an exit path (EXIT PATH) at the left end, using a conventional auger A9 (see FIG. 17) in a controlled and predictable manner which allows for precise deposited energies. Exposure tube J9 is a 4 inch diameter heated tube or auger housing which generates 0.4 W/cm$^2$ of Medium Wavelength Infrared radiation at the inside surface of the exposure tube J9 (heated auger housing) (MWIR APPLIED), and seeds are exposed to this radiation an estimated 2 seconds on average as they pass leftward in the Figure through the system. This imparts approximately 0.8 Joules/cm$^2$ to the seed for each experimental run through the system.

The auger and auger housing are a total of 5 feet in length, while the heated section of the auger housing is 3 feet. To generate Medium Wavelength Infrared, there is a known emissive coating on the inside of the auger housing (not explicitly shown, indicated by MWIR emitter E). When heated to a target temperature of 350° F. it generates Medium Wavelength Infrared radiation. The emissive coating can be known thermally sprayed borosilicate glass at a thickness necessary to provide/full coverage of the inside of the auger housing. The emissive coating (POWDER COAT of FIG. 27) is heated using a commonly available known brisk heat silicone tape heater 2 inches in width and 24 ft. in length, wrapped around the outside of the 4 inch diameter exposure tube J9 (not shown). The silicon tape heater uses known resistive heating and can be helically wrapped about for a total axial length of 3 feet, and with a heat output of 2,476 watts. The wrapped silicone tape heater (not shown for clarity) can be insulated by 1 inch thick wrapped fiberglass insulation with a PTFE liner (not shown). Temperature can be controlled using a known controller At the left half of exposure tube J9, is an IRID emitter 88 which delivers Indigo Region Illumination Distribution light into the exposure tube via apertures (not shown). An IRID emitter 88 can be selected (discussed below in the description accompanying FIG. 23) to comprise "blue light" LEDs (light emitting diodes) with a central output at 440 nm wavelength, at an intensity of 0.07 W/cm$^2$ into the exposure tube J9 and the auger A9 can be operated such that seeds are exposed to this Indigo Region Illumination Distribution radiation for an average of 0.1 seconds. With both Medium Wavelength Infrared MWIR and Indigo Region Illumination Distribution IRID exposures, each run imparts approximately 0.807 Joules/cm$^2$ to seed.

Figure 19:
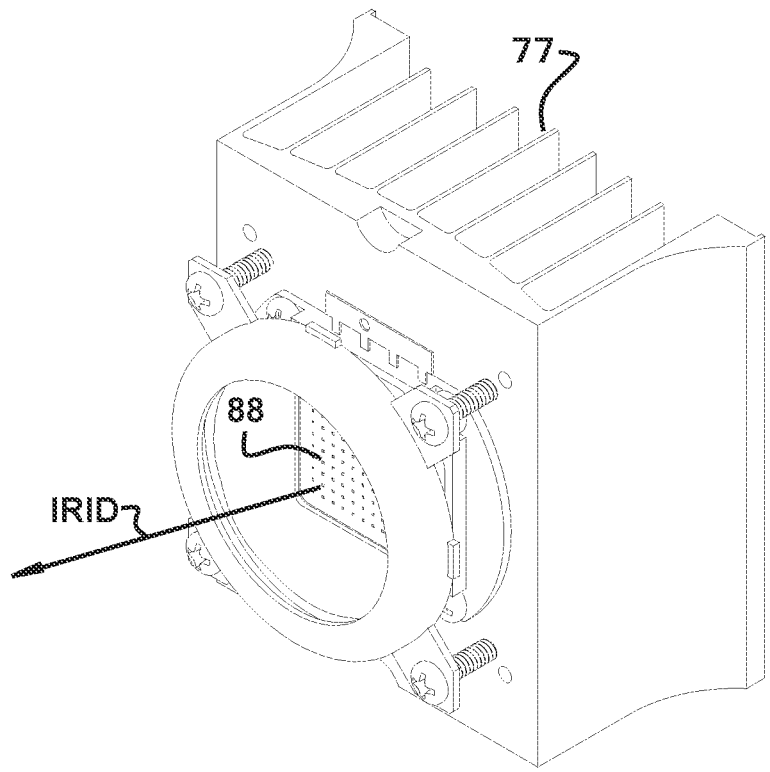
FIG. 19 shows a close-up of a IRID emitter employed in the auger fed tubular exposure unit of FIGS. 15-18.

Now referring to FIG. 19, a close-up is shown of a IRID emitter employed in the auger fed tubular exposure unit of FIGS. 15-18. As will be discussed below, the blue light can be generated by 6 100 W 440 nm-450 nm known high power LED chips, with a 120° to 140° emitting angle. The LED chips are mounted onto an aluminum heat sink. A glass cover (not shown) can comprise a lens to project Indigo Region Illumination Distribution light into exposure tube J9.

Tests on Dent Corn Seeds

Tests were run on dent corn seed, to expose seeds to Medium Wavelength Infrared and an Indigo Region Illumination Distribution for the above cited irradiances and times, up to five separate runs each, with exposure time totals of about 2.1 seconds each run. The seeds were then germinated in soil in a greenhouse environment. Tracking the timing and quantify of seeds that germinated, it was found that dent corn that was run through the system 2 times or 3 times had substantially higher germination rates than a control with no irradiances. There also was found an increase in root biomass, as 1 or 3 runs through the system resulted in large increases in root biomass, from 12 grams (control) to 16 grams. Observed germination rates went from 74 percent in the no-radiation control group up to 92-94 percent for 1.6 and 2.4 Joules/cm$^2$.

Tests on Rye Seeds

Tests were run on rye seed, using 0, 1, 2, 3 or 4 runs. The rye seeds were then planted in soil in trays at high density. Visually, it was clear that rye seeds ran through the auger fed tubular exposure unit one time generated a substantially more vigorous stand (denser seedlings with larger above ground biomass in total and per seedling) than the no-radiation control. This indicates efficacy of the method taught and claimed in the instant invention for 0.87 Joules/cm$^2$.

Tests on Soybeans

Tests run 1 or 2 times (0.87 Joules/cm$^2$ and 1.74 Joules/cm$^2$) using 50 lb bags of seed for each case. Using a 16 row planter and planting during a normal planting schedule, filled two selected rows treated seeds, while filling the rest of the field no radiation control seeds. Early germination was detected, by counting periodically the number of germinated seedlings on random 1 meter lengths of control (non-treated) rows and treated (irradiated) rows. Seeds treated using the instant invention resulted in germination that was two days earlier, thereby establishing the stand approximately 2 days earlier.

Tests on *Glycine Max* (Soybeans)

Tests run using the Auger Fed Tubular Exposure Unit, illuminating with Medium Wavelength Infrared MWIR at 0.4 Watts/cm$^2$ for two seconds, and Indigo Region Illumination Distribution IRID at 0.07 Watts/cm$^2$ for ¼ second resulted in a 62% germination rate, compared to a 24% germination for an untreated control group. Similar tests on twenty-two 50 lb bags of Wensink™ 2.9 early mid-season soybeans yielded an average V stage (emergence) count of 3.87 for treated plants versus 3.25 for control (untreated) plants.

TABLE 1

| Tests on Beets | |
|---|---|
| Cumulative illumination energy applied (J/cm$^2$) | Plants emergent 8 days after planting |
| 0 (Control) | 339 |
| 0.81 J/cm$^2$ | 362 |
| 1.62 J/cm$^2$ | 396 |
| 2.43 J/cm$^2$ | 418 |
| 3.24 J/cm$^2$ | 298 |

Tests run on equal numbers of beet seeds with 4/10 W/cm$^2$ MWIR and 0.07 W/cm$^2$ IRID.

Although Medium Wavelength Infrared and Indigo Region Illumination Distribution are preferred, some seeds have been found to respond to red light.

Figure 20:
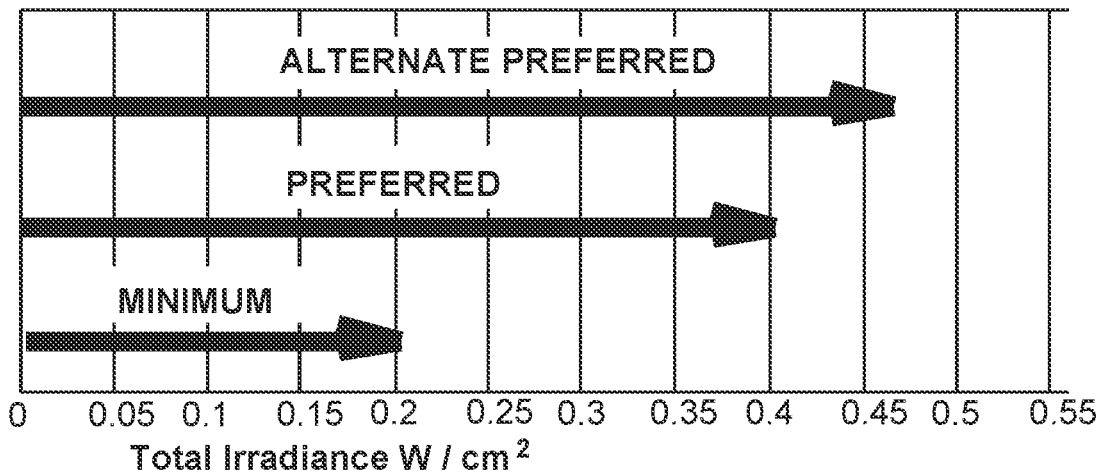
FIG. 20 shows numerically via a graphic various discovered irradiances that engage an innate stimulative exposure response according to the invention.

Now referring to FIG. 20, a graphic shows numerically various discovered minimum average irradiances that engage an innate stimulative exposure response according to the invention, and as shown in FIGS. 12-14. These minimum average irradiances were discovered to be required to engage and cause the irradiance-sensitive and energy-sensitive innate stimulative exposure response in a seed. The minimum average irradiance to engage is 0.2 W/cm$^2$, and preferred minimum average irradiances can be selected from any of 0.3 W/cm$^2$, 0.4 W/cm$^2$, 0.5 W/cm$^2$, 0.6 W/cm$^2$, 0.7 W/cm$^2$, 0.8 W/cm$^2$, 0.9 W/cm$^2$, and 1.0 W/cm$^2$.

Figure 21:
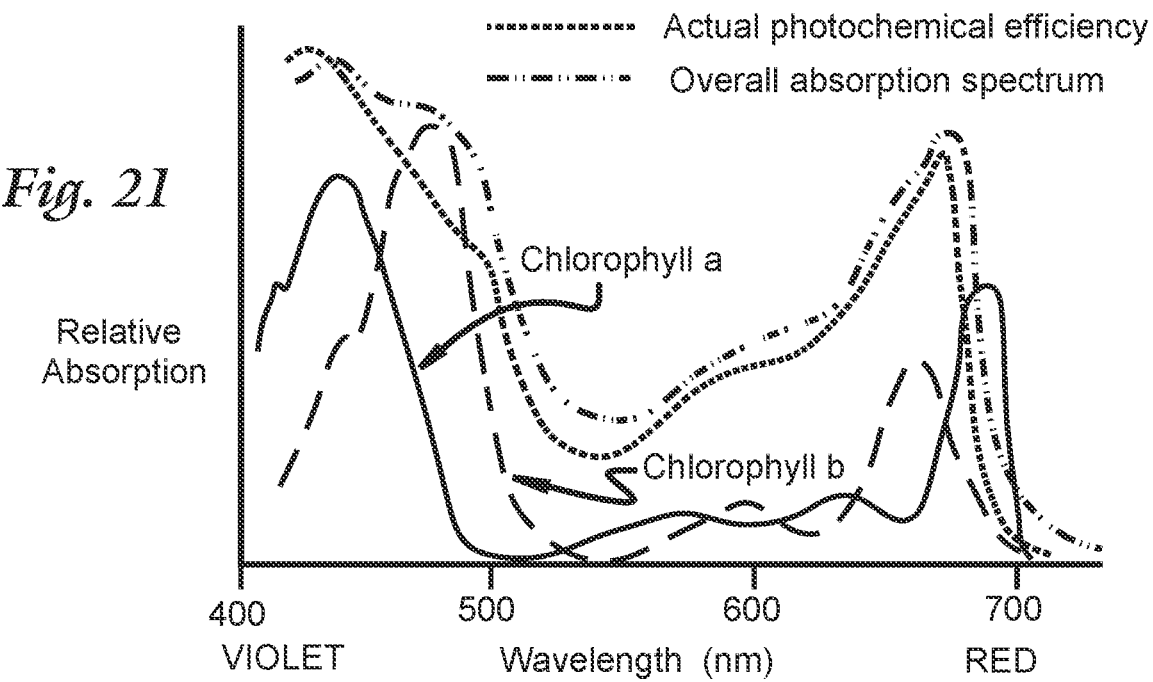
FIG. 21 shows a cartesian plot of relative optical absorption and photochemical efficiency for a plant as a function of wavelength from 400 to 700 nm, and showing absorption for Chlorophyll a and Chlorophyll b.

Now referring to FIG. 21, a cartesian plot of known relative optical absorption and photochemical efficiency for a typical plant is shown as a function of wavelength from 400 to 700 nm. The plot shows relative absorption for Chlorophyll a and Chlorophyll b, and also actual photochemical (photosynthetic conversion) for a typical plant, as well as the overall (optical) absorption spectrum of the plant overall. As can be seen there are two relative peaks centered about blue/violet and red light and this is the regime operation for the bulk of the excitation that fuel photosynthesis and internal regulation in plants, generally.

Figure 22:
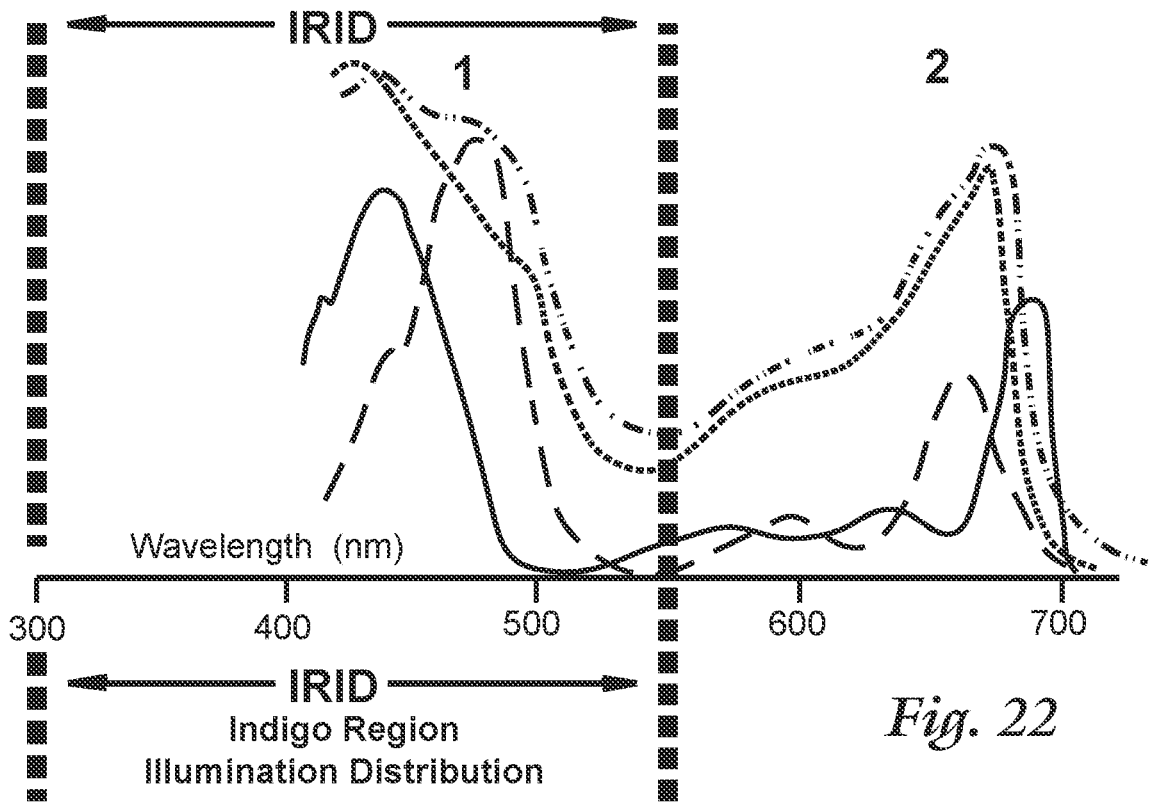
FIG. 22 shows the cartesian plot of FIG. 21, with a superimposed span of an Indigo Region Illumination Distribution shown.

Referring now to FIG. 22, the cartesian plot of FIG. 21 is shown, with the span of an Indigo Region Illumination Distribution IRID in service to the instant invention shown. As can be seen, the Indigo Region Illumination Distribution IRID can extend from 300 nm to a relative low between the two absorption peaks for a typical plant that are due to photochemical action of Chlorophyll a and Chlorophyll b. Specifically, the wavelength regime 1 shown in the Figure to the left of the vertical dotted line depicting 550 nm is that for use as the Indigo Region Illumination Distribution IRID according to the invention. The wavelength regime 2 shown to the right of the 550 nm line that includes yellow, orange and red was found from experimentation using controls to be less often as effective for treating seeds, but nonetheless can be utilized Now referring to FIG. 23, a schematic representation across this range of 300 nm to 550 nm for an Indigo Region Illumination Distribution is shown with various illustrative possible distribution patterns that are possible. This Figure does not show spectral intensity, or spectral irradiance, that is, W/cm$^2$ per unit wavelength—which can vary. The Figure shows only the presence of radiation in particular wavelength, without intensity information.

The first distribution depicted, s1, shows a near full span of the range between 300 and 550 nm, continuous and solid. The second distribution s2 shows another possible distribution from 400 to 550 nn, not continuous and absent UV-A radiation. A third distribution s3 shows various spectral lines of output, with the highest energy radiation at about 480 nm, and consisting of only six emission lines as shown. This can arise from various light sources, such as lasers, and especially ion discharge lamps with no intervening phosphor, etc. A fourth distribution s4 is continuous in part like distribution s1, but is absent mid-wavelengths, and notably is absent wavelengths associated with indigo, for which the Indigo Region Illumination Distribution IRID is named. All these, and other similar distributions are possible as preferred embodiments in service of the instant invention.

Appearance of the Indigo Region Illumination Distribution IRID to the human eye shall not be indicative of suitability, A Indigo Region Illumination Distribution may not appear "blue" or 'indigo" to the human eye because of the effect of constituent wavelength components—and response of the human eye to light distributions, including known effects of metamerism, shall not limit or narrow the scope of the appended claims, nor narrow the instant teachings. In the protocol taught and claimed in the instant disclosure, the preferred range of wavelengths for the Indigo Region Illumination Distribution is 400-500 nm, with a distribution centered at about 430-450 nm.

Known commercially available high output "blue" LEDs (light emitting diodes) can be used to provide necessary light for Indigo Region Illumination Distribution IRID, providing light generally in a wavelength range from 400 to 550 nm. For example, known SiC (silicon carbide) based LEDs with output from 430-505 nm (appearance blue) are available and have a Forward Voltage of 3.6 volts; GaN (Gallium Nitride) and InGaN (Indium Gallium Nitride) based diodes are also available. Mixture of GaN with In (InGaN) or Al (AlGaN) with a band gap dependent on alloy ratios allows manufacture of light-emitting diodes (LEDs) with varied output peaks. Some LED devices using Aluminium Gallium Nitride (AlGaN) produce ultraviolet (UV-A) light also suitable for a Indigo Region Illumination Distribution, and known phosphors can be used to extend spectral range or to serve another objective such as making a trademark color splash without departing from the scope of the invention and appended claims.

To construct a Indigo Region Illumination Distribution IRID source, commercially available high power UV/violet LED chips are thus available in varied peak distribution wavelengths such as 365 nm, 370 nm, 375 nm, 385 nm, 390 nm 395 nm, 400 nm, 405 nm, and 425 nm with input power ranging from 3 to 100 watts, such as available from Shenzhen Chanzon Technology Co., Ltd., ShenZhen, Guangdong, China. The embodiments shown in Figures which follow employ a 100 watt array, 450 nm peak output. Larger arrays can be built up from constituent chips to serve the requirements of the instant invention for larger scale applications.

Figure 24:
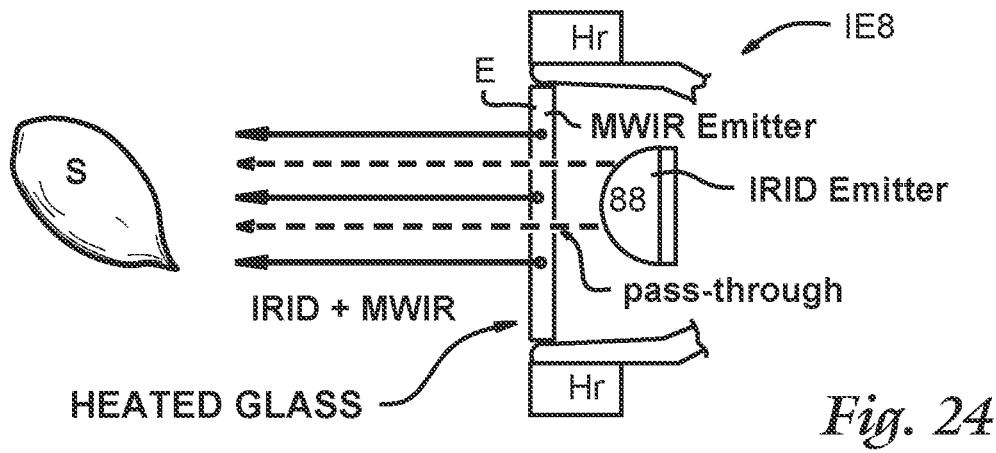
FIGS. 24 and 25 show cross-sectional representations of an illustrative proximity pass-through configuration illuminator according to the invention.
Figure 25:
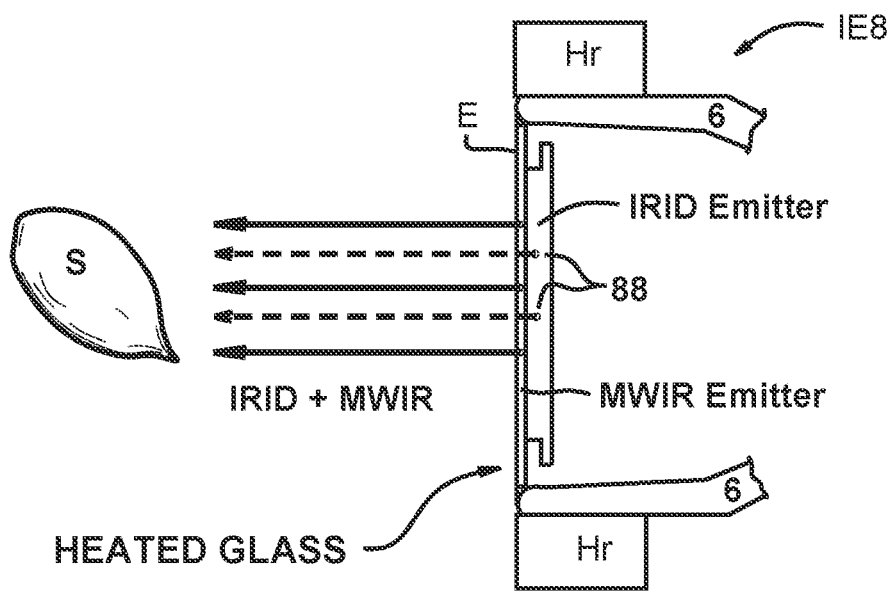

Now referring to FIGS. 24 and 25, simple schematic cross-sectional representations of an illuminator IE8, specifically a advantageous, compact proximity pass-through configuration illuminator (PROXIMITY PASS-THROUGH CONFIGURATION ILLUMINATOR) according to the invention, are shown. Inside a housing 6, are a IRID emitter 88 and a MWIR emitter E. As can be seen, the IRID emitter and the MWIR emitter are sized, positioned and oriented to allow light output from each of said IRID emitter and MWIR emitter to be substantially superposed for directing to seed S. with rays of type shown in FIGS. 15 and 16 being directed to the seed Sat the left of the Figure. Light generated as shown emerging from IRID emitter 88 passes through the physical MWIR emitter E. MWIR emitter E can comprise glass in various forms, such as plate glass, and be can be any of borosilicate glass, Pyrex® Glass Code 7740, soda lime glass, and other materials like aluminum oxide ceramic, and any such as that having high thermal emissivity in the range of Medium Wavelength Infrared wavelengths as defined herein. This can include materials having coatings or surface treatments that have favorable MWIR emission characteristics.

MWIR emitter E is heated using a heater assisted by a heating ring Hr as shown, in thermal communication with illustrative glass (e.g., borosilicate glass) of MWIR emitter E. Borosilicate glass and other similar materials conduct heat across themselves, and this heated glass allows efficient coupling into MWIR wavelengths and allows a pass-through of Indigo Region Illumination Distribution IRID light as shown.

Figure 26:
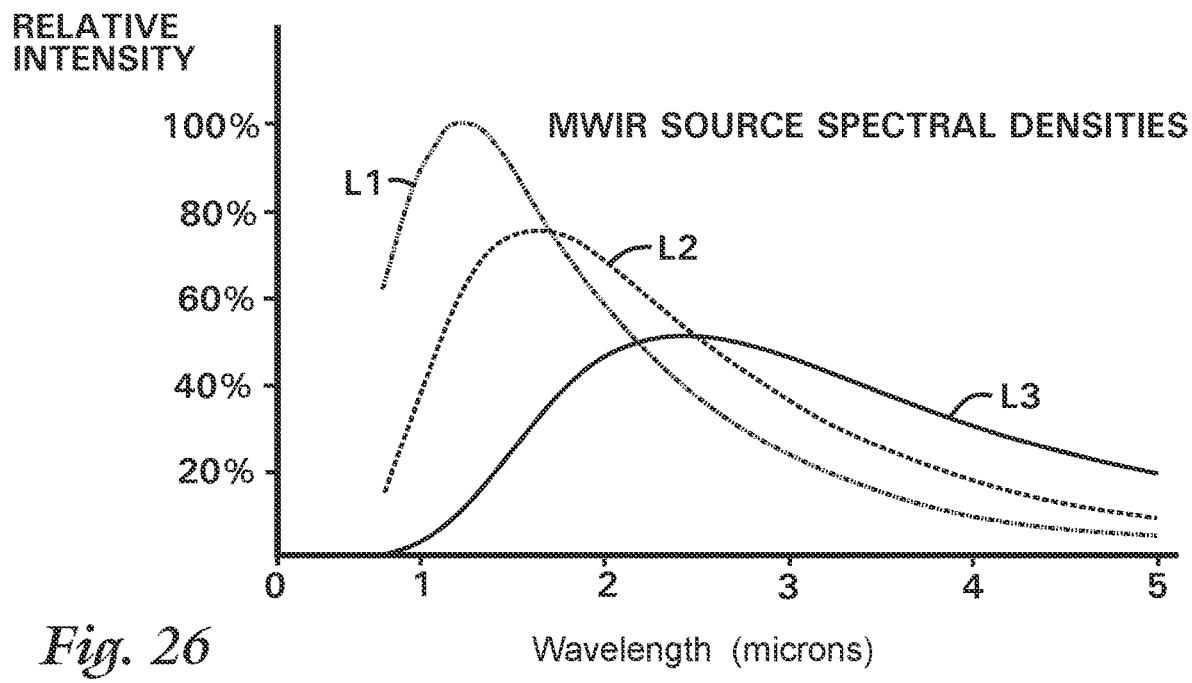
FIG. 26 shows three illustrative cartesian plots of spectral density versus wavelength for three possible Medium Wavelength Infrared light sources for use by the instant invention.

An alternative to heating a preferred borosilicate glass MWIR emitter E using a heating ring Hr is the use of heat sources in the form of commercially available known tubular lamps, and illustrative spectral densities for these are given in FIG. 26.

Now referring to FIG. 26, three illustrative cartesian plots of spectral density versus wavelength for three possible Medium Wavelength Infrared light sources for use by the instant invention are shown. In the instant teachings, the wavelength of the MWIR emitter E figures importantly, with 2-8 microns preferred, including 2-5 microns.

Such tubular lamps provide radiation in service of the instant invention, or provide thermal excitation to produce such radiation, as discussed below (see FIGS. 44-46, and other Figures).

The three spectral plots represent three different tubular lamps:

L1 depicts a spectral density for a clear halogen lamp with a pyrex outer jacket, operating temperature 2400K, with a peak output wavelength of 1.3 microns. This lamp is preferred to obtain high radiation output because of its high operating temperature, and the output can be used to excite borosilicate glass in proximity, as known by those of ordinary skill in the art of lamp design and heat sources.

L2 depicts a ruby/gold-plated halogen lamp spectral density for a clear halogen lamp with a pyrex outer jacket, operating temperature 1800 K, with a peak output wavelength of 1.6 microns.

L3 depicts a spectral density for a clear halogen lamp with a carbon fiber filament and a quartz outer jacket, operating temperature 1200 K, with a peak output wavelength of 2.5 microns. This lamp is preferred when using as a direct light source to practice the instant invention, because the substantial share of the radiation output is at the preferred range of 2-8 microns.

These above lamps (not shown) are standard configurations and available from Lianyungang O-Yate Lighting Electrical Co., Ltd, Lianyungang City, Jiangsu Province, China.

Figure 27:
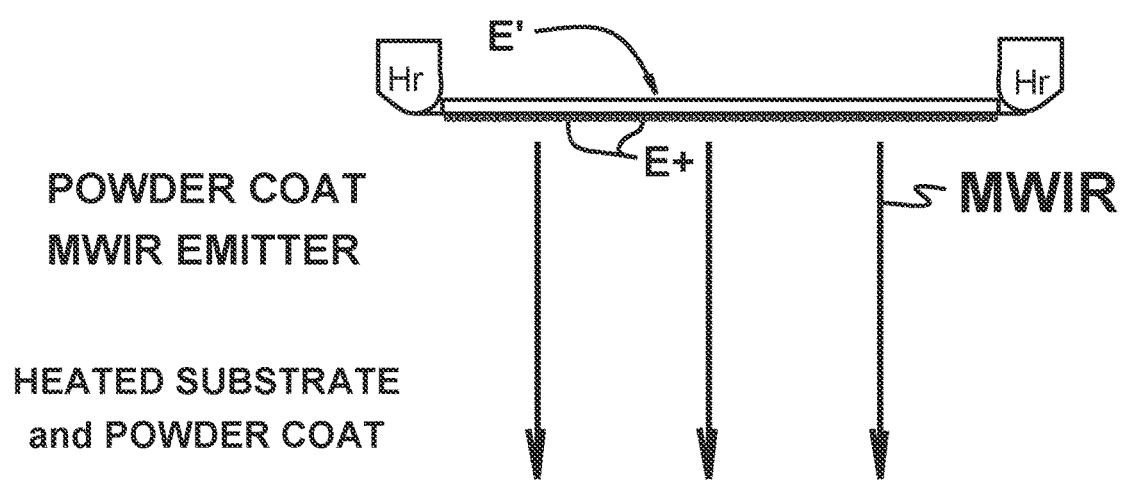
FIG. 27 shows a cross-sectional schematic view of a Medium Wavelength Infrared (MWIR) emitter that employs an emissive powder coat for enhanced emission.

FIG. 27 shows a cross-sectional schematic view of a Medium Wavelength Infrared (MWIR) emitter that comprises an emissive powder coat for enhanced emission. A powder coat MWIR emitter, e.g., ground or powdered borosilicate glass, can be put onto a surface which is heated for operation according to the invention. Specifically, as shown, powder coat MWIR emitter E+ is affixed or coated upon a heated substrate E', which can derive heat from heat ring Hr or the above tubular lamps alluded to above in the description for FIG. 26. Rays from any Indigo Region Illumination Distribution IRID passing though powder coat MWIR emitter E+ are not shown for clarity. This embodiment can reduce costs and weight, and can allow for optimization of output. This allows the powder coat to be illuminated independently to provide heating. This excitation can include optical radiation (in a variety of possible wavelengths) such as from lamps; glowing filaments or other bodies, microwave radiation, laser light, and flood and spot lamps, such as high intensity halogen enhance filament lamps, or LED lamps, using known reflector or other optics. Arrays can be used that are proximate the powder coat MWIR emitter E+ along a length, or a spot beam can be used. In this illustrative example, a simple substrate which is not an Medium Wavelength Infrared emitter, can be used.

One can use known powdered, sintered, or particulate materials, comprising borosilicate glass or other glasses or MWIR emissive materials, to provide the main radiation source that establishes the specific Medium Wavelength Infrared MWIR called for in service of the invention as taught and claimed. If desired, underlying heated substrate E' can itself be a MWIR emitter E as well. In addition, MWIR emitter E+ can be externally optically energized from a distance—or heated with an external lamp or source (not shown) as those of ordinary skill in the art can appreciate.

Now referring to FIG. 28, a schematic arrangement is shown using separate MWIR and IRID sources used to irradiate a seed S. Illustratively shown powder coat MWIR emitter E+ and LED array IRID emitter 88 are separately housed and light output is not undergoing superposition as in the previous FIGS. 23 and 24. Guide optics can be provided using known reflectors, transmitters, light guides, refractors, etc. to direct Medium Wavelength Infrared MWIR and Indigo Region Illumination Distribution IRID as taught and claimed. The guide optics can include moveable parts such as reflector flaps that respond yieldingly to a harvester combine separation stage conditions. Possible alternative Medium Wavelength Infrared MWIR sources can include known $CO^2$ (carbon dioxide) lasers, and infrared LEDs (Light Emitting Diodes).

Figure 29:
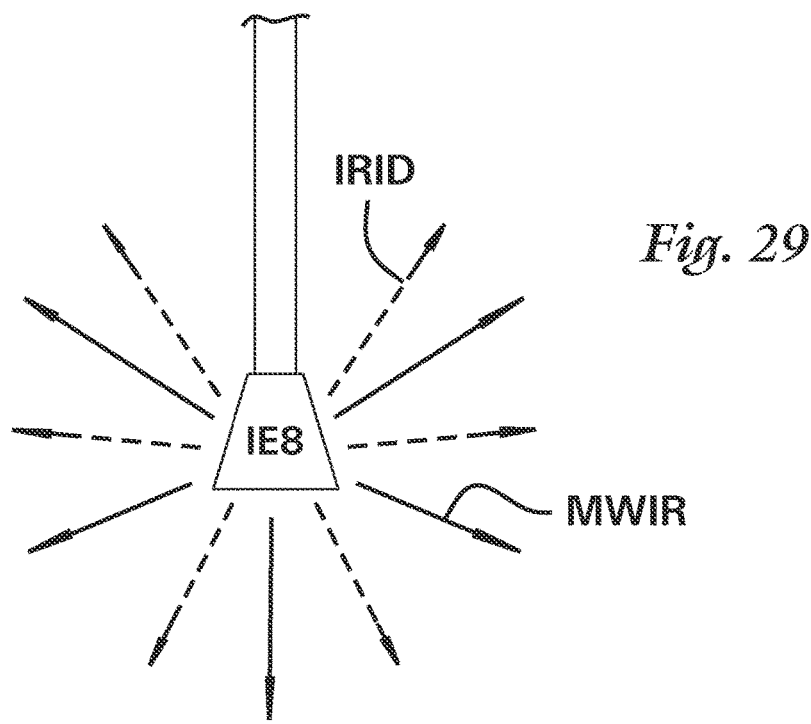
FIG. 29 shows an illuminator according to the invention, in schematic cross-sectional view.

Now referring to FIG. 29, an illuminator according to the invention is shown in schematic cross-sectional view. Illuminator IE8 as shown can be comprised of sources MWIR emitter E and IRID emitter 88 as disclosed above, and affixed using known techniques inside a processing theater.

Figure 30:
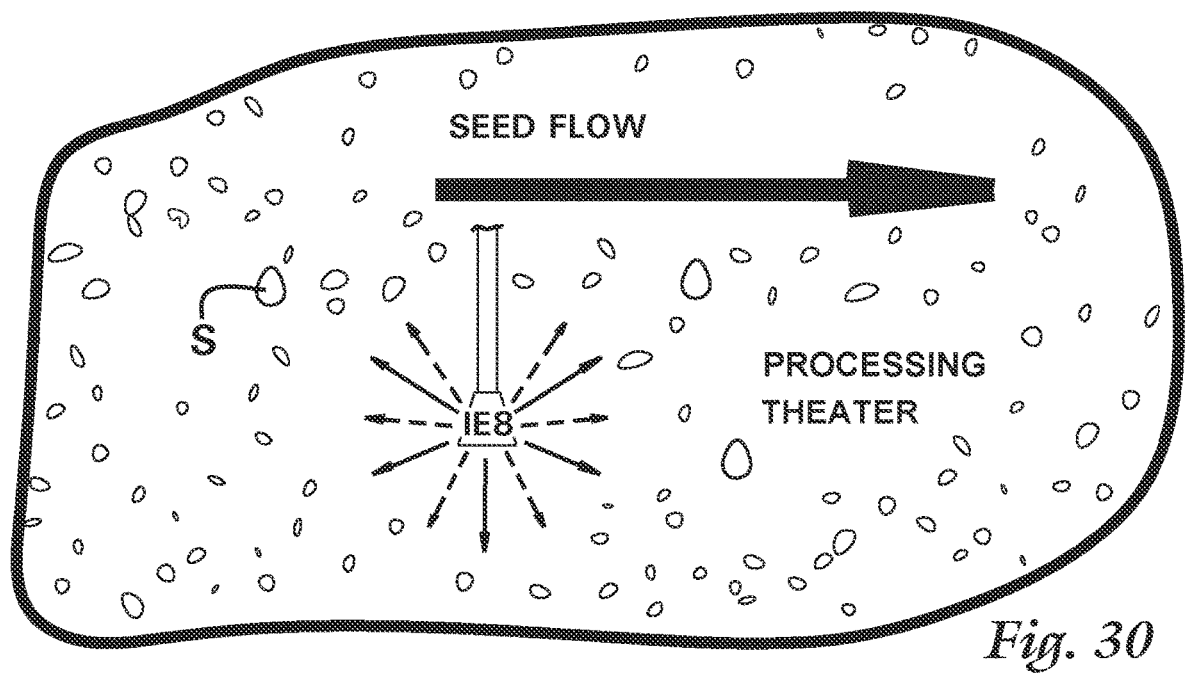
FIG. 30 shows an illustrative interior volume inside an open processing theater volume.

Now referring to FIG. 30, an illustrative interior volume is shown inside an open processing theater volume supporting a transverse SEED FLOW as indicated to the right on the FIGURE. This transverse seed flow can be driven by moving air, or by the seeds being thrown by an impeller (not shown). The illumination sought, can be if preferred, due to participation in a statistical process, from illumination by multiple illuminators IE8.

Figure 31:
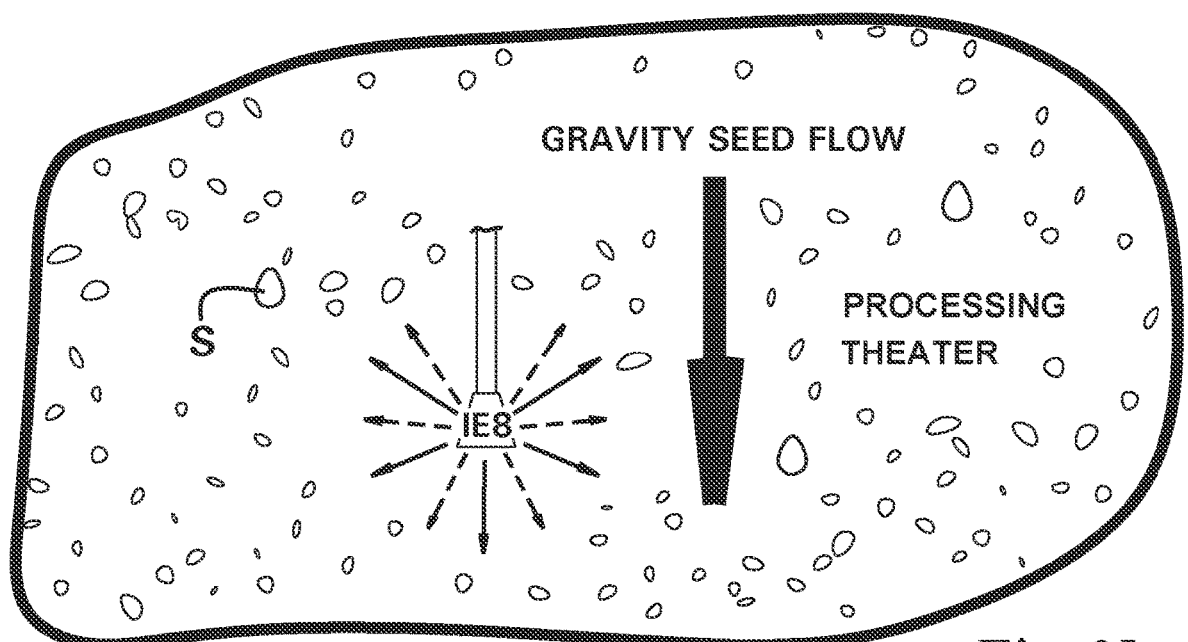
FIG. 31 shows an illustrative open processing theater volume using gravity seed flow.

Now referring to FIG. 31, an illustrative open processing theater volume is shown, using gravity seed flow.

Figure 32:
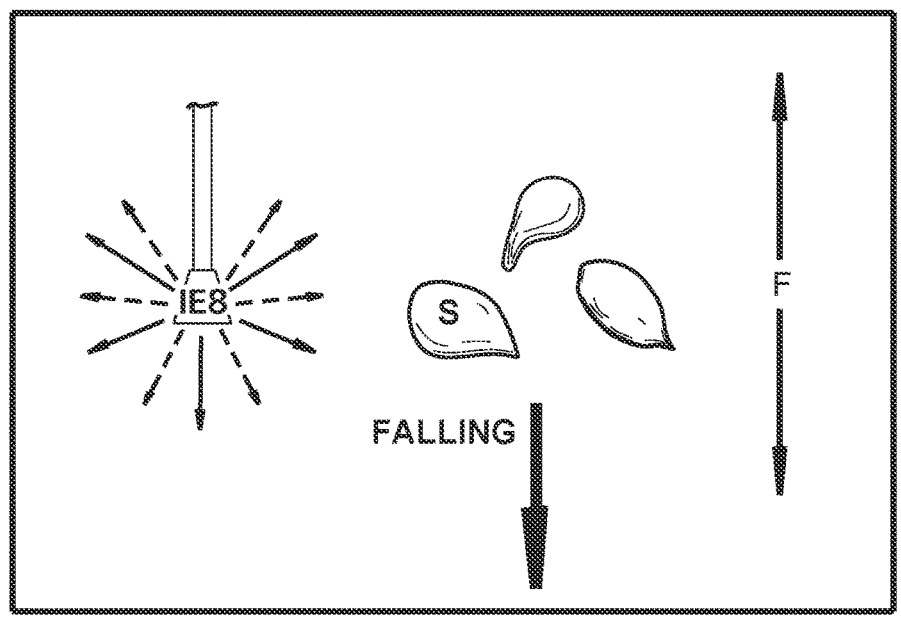
FIG. 32 shows a schematic selection from FIG. 31 for gravity drop irradiation using time of flight exposure.

FIG. 32 shows a schematic selection from FIG. 31 for gravity drop irradiation using time of flight exposure. If desired, the illumination of the instant invention can be applied to falling seeds, such as adjacent a hopper, and where seeds S are falling past at least one illuminator IE8. This is CALIBRATED GRAVITY DROP IRRADIATION as shown. Those skilled in the art can devise and design a configuration whereby a time of flight F results in an appropriate illumination to meet the requirements of the claimed invention. This provides high speed operation for treating bulk amounts of seed falling through a chamber, not shown. This irradiation process can also be applied by those of ordinary skill to seeds that are in motion in air, such as flying through air after being propelled.

A prime mover for agriculture around the world for harvesting a cash crop is the harvester combine, or "combine," for short. It is so named because it typically performs three functions:

[1] reaping the crop (gathering and cutting); [2] threshing the grain, to remove it from the plant that is harvested; and [3] separating the grain from chaff, tailings, and confounding materials, including cleaning and materials handling. Combines are complex, expensive and have helped produce an economic and agricultural boon around the world. Manufacturers include John Deere, Case International Harvester, New Holland, Massey Ferguson, Claas, and others.

In older combine harvester designs, a turning cylinder threshes the crop, then reciprocating straw walkers takes grain from the crop. In newer designs that are more prevalent today, a specialized rotor or twin rotors both thresh and separate the grain from the plant. In hybrid designs, a cylinder threshes the grain, then the grain is passed to two specialized rotors that separate the grain from the plant. The grain is typically loaded using augers or other transport into a tank at the top of the combine, or off-loaded.

Specifically, a unit called a header (cutting platform) divides, gathers and cuts the crop and the harvest is augured or transported to the threshing unit. The threshing unit separates the grain or cash crop from the ears, husks, stems, and straw, and the separator separates grain from chaff, which itself can contain weed seeds. In threshing, impact, rubbing action, and centrifugal forces are used to urge grains or beans from the MOG (material other than grain). Tangential threshing cylinders or units with raspbars, or rotary separation are used, with axial or tangential harvest paths. For information on combine harvesters, see [REF 2: CIGR Handbook of Agricultural Engineering, Volume III, Plant Production Engineering, Edited by CIGR (The International Commission of Agricultural Engineering), Volume Editors Bill A. Stout, Bernard Cheze, Published by the American Society of Agricultural Engineers, © 1999, hereby incorporated in this disclosure in its entirety].

For further information on combine harvesters, see [REF 3: Combine Harvesters: Theory, Modeling and Design, Petre Miu, CRC Press, Boca Raton, Florida, ©2016, hereby incorporated in this disclosure in its entirety].

Figure 33:
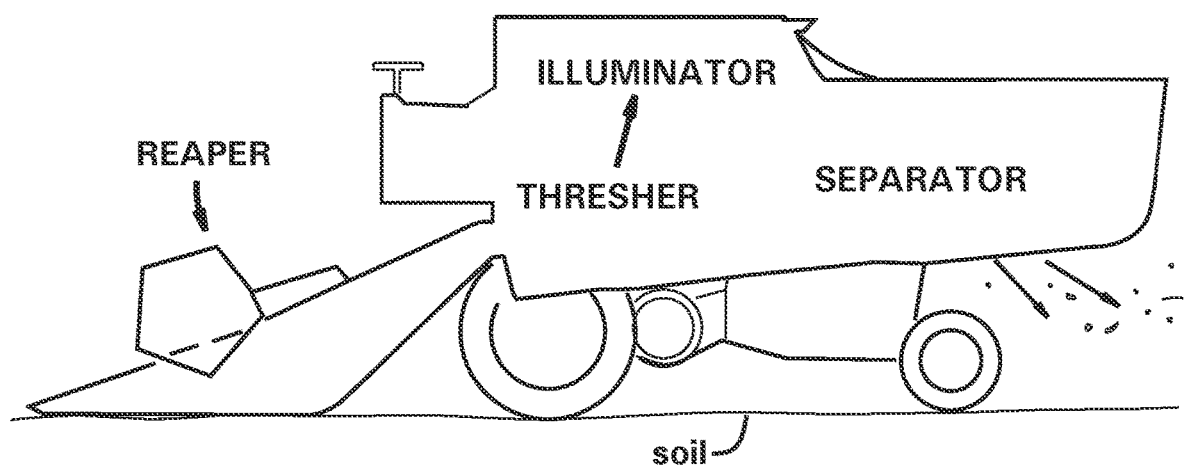
FIG. 33 shows an illustrative schematic silhouette of a combine harvester additionally comprising an illuminator or illumination unit, shown as functional block, according to the invention.
Figure 54:
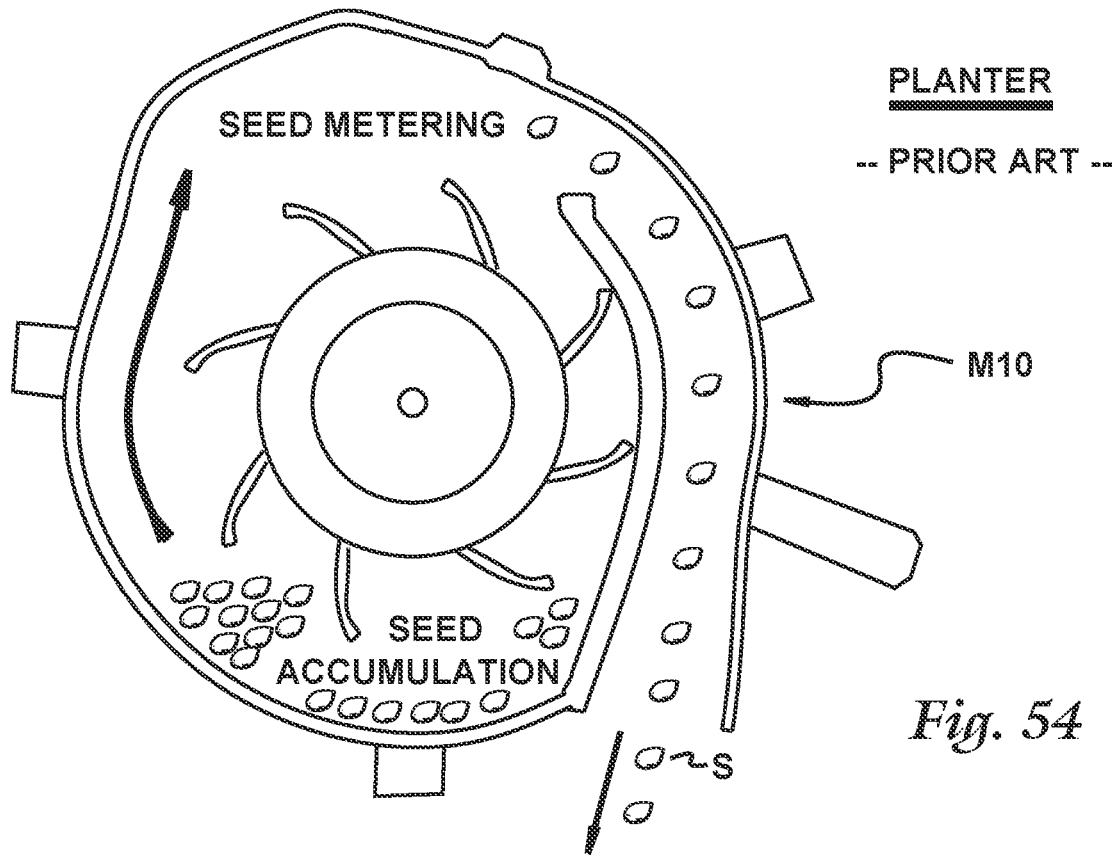
FIG. 54 shows a cross-sectional schematic view of metering and accumulation points in a prior art agricultural planter.

Now referring to FIG. 33, an illustrative schematic silhouette of a combine harvester additionally comprising an illuminator or illumination unit. The combine harvester is shown having a REAPER, a THRESHER, and a SEPARATOR. If desired, the instant invention can be utilized inside a combine harvester to deliver illumination according to the invention to seeds emerging from the THRESHER, as those skilled in the art can devise, such as by use of the auger fed tubular exposure unit of FIGS. 15-18 to elevate or transport seeds for subsequent storage or transport. Similarly, the invention can also be used as part of a known seed planter or seed drill (not shown) to irradiate and deliver seeds that have undergone the illumination of the instant invention. See the description below (FIG. 54).

Figure 34:
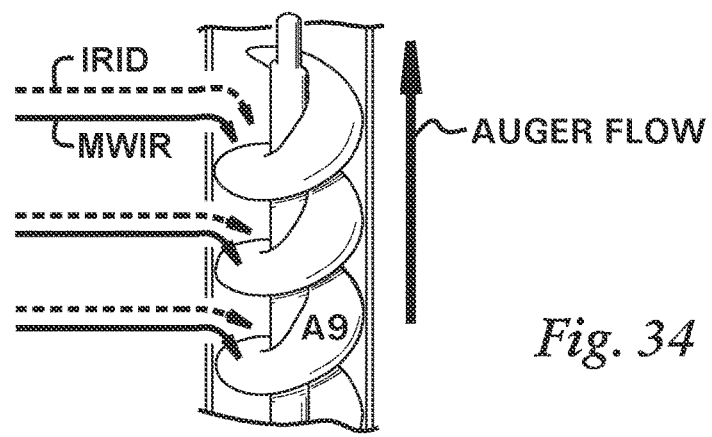
FIG. 34 shows an illuminated auger transport device according to one embodiment of the invention.

Now referring to FIG. 34, an illuminated auger transport device according to one embodiment of the invention is shown. This is a general type of embodiment like that shown in FIGS. 15-18 suited for natural points in a typical harvester combine where there are opportunities to illuminate a seed flow flow according to the invention, such as seed conveyors, and seed elevators. An illuminated auger is shown with a screw blade or flighting A9 inside a tube, with auger flow (AUGER FLOW) upward as indicated.

Specifically, the auger glass lining or cylinder can be equipped, as those skilled in the art can devise, with a illuminator IE8 that emits Medium Wavelength Infrared MWIR and/or Indigo Region Illumination Distribution IRID, at a processing theater inside the auger or flighting A9. In addition, auger or flighting A9 can be fabricated from, or comprise, borosilicate glass, Pyrex® Glass Code 7740, soda lime glass, or aluminum oxide ceramic, and can also comprise a powder coat. This would allow heating the auger or flighting A9 to provide further Medium Wavelength Infrared radiation emissions as taught and claimed here.

Now referring to FIG. 35, shows a cross-sectional schematic of a harvest Q of seeds is shown under direct illumination to receive a preferred illumination atop a seed accumulator belt 3Z according to the invention. This Figure shows direct exposure illumination with Medium Wavelength Infrared MWIR and Indigo Region Illumination Distribution IRID. The thickness of the material on the mat (not shown to scale on this and other figures) is 3 mm to 6 mm preferred.

Now referring to FIG. 36, a cross-sectional schematic similar to that of FIG. 35 is shown, but using a radiant seed accumulator belt. In this embodiment of the invention that concerns material handling and exposures, the radiant seed accumulator belt 3ZE is itself also a MWIR emitter E, and can comprise borosilicate glass (Pyrex®), and similar glass like Pyrex® Glass Code 7740, and soda lime glass, and also aluminum oxide ceramic. The radiant seed accumulator belt 3ZE is so constructed and formed to comprise an MWIR emitter (E), which itself is so formed, composed and positioned to emit Medium Wavelength Infrared radiation by heating of, and thermal emission from, at least a portion of the radiant seed accumulator belt itself.

The radiant seed accumulator belt 3ZE is heated using heat sources (not shown) or using waste heat from other light sources (such as either Medium Wavelength Infrared or Indigo Region Illumination Distribution sources). The preferred wavelength output range for MWIR emitter E ranges from 2 to 8 microns. The MWIR emitter E in radiant seed accumulator belt 3ZE can be composed using known techniques to comprise a powder coat, and that powder coat can, like the MWIR emitter E itself, comprise a glass selected from borosilicate glass, Pyrex® Glass Code 7740, and soda lime glass, or alternatively aluminum oxide ceramic.

Now referring to FIG. 37, a cross-sectional schematic similar to that of FIG. 36, but using a transmissive seed accumulator belt. The transmissive seed accumulator belt 3Z8 is so constructed and formed to allow a light wavelength distribution comprising an Indigo Region Illumination Distribution IRID (source IRID emitter 88 not shown for clarity) to pass through the radiant seed accumulator belt to allow transmission of the Indigo Region Illumination Distribution to a seed. As can be seen from the Figure, an Indigo Region Illumination Distribution IRID is applied to the underside of the belt, and passes through the belt itself to allow illumination of a seed to provide a illumination according to the invention. The transmissive seed accumulator belt 3Z8 can operate by use of apertures or slits or pores or holes; or alternatively by transparency or by translucence, in any combination. Fiberglass or fibrous fabrics made at least in part from glass, can fit this purpose, as known in the glass arts.

Figure 38:
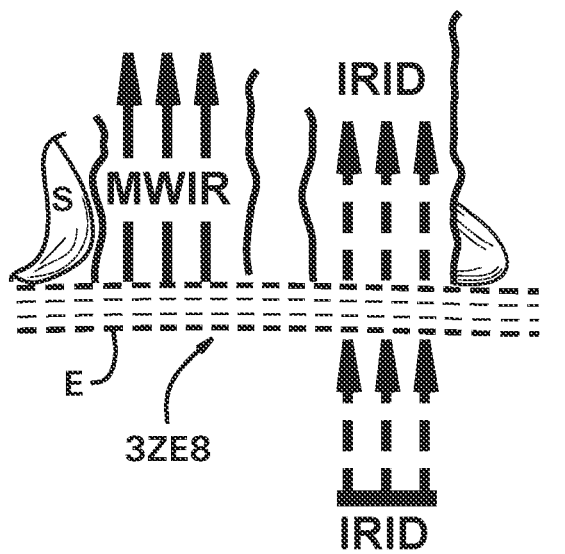
FIG. 38 shows a cross-sectional schematic similar to that shown in FIG. 37, but depicting a radiant and transmissive seed accumulator belt.

Now referring to FIG. 38, a cross-sectional schematic is given similar to that shown in FIG. 37, but depicting a radiant and transmissive seed accumulator belt. Radiant and transmissive seed accumulator belt 3ZE8, [1] is also constructed and formed to comprise an MWIR emitter (E), which itself is so formed, composed and positioned to emit Medium Wavelength Infrared radiation by heating of, and thermal emission from, at least a portion of the radiant seed accumulator belt itself; and [2] is also so constructed and formed to allow a light wavelength distribution comprising an Indigo Region Illumination Distribution IRID (source IRID emitter 88 not shown for clarity) to pass through the radiant seed accumulator belt to allow transmission of the Indigo Region Illumination Distribution to a seed.

Medium Wavelength Infrared MWIR emerges upward in the Figure as shown, while Indigo Region Illumination Distribution IRID passes from the underside of the belt in the Figure, passing through to illuminate the seed load shown. Those skilled in the optical arts can add diffusers, concentrators, and reflectors to radiant and transmissive seed accumulator belt 3ZE8. Direct sources of Medium Wavelength Infrared radiation and Indigo Region Illumination Distribution can be added without departing from the scope of the invention and claims.

Figure 39:
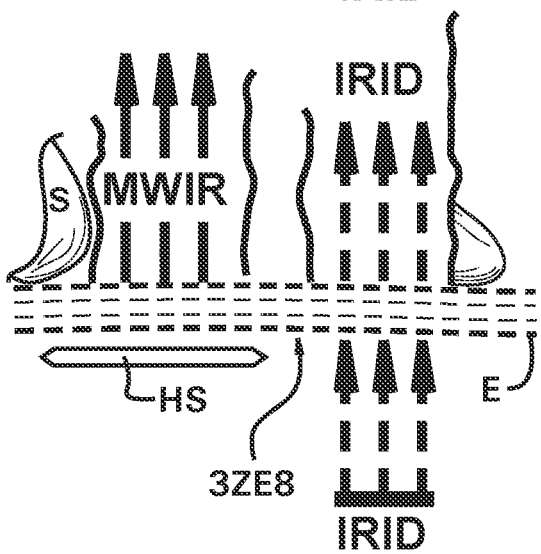
FIG. 39 shows the cross-sectional schematic of FIG. 38, additionally comprising a heat source to heat the radiant and transmissive seed accumulator belt.

Now referring to FIG. 39, the cross-sectional schematic of the radiant and transmissive seed accumulator belt 3ZE8 of FIG. 38, is shown additionally comprising a known heat source HS (such as a tubular lamp) heating the underside of the belt to heat the radiant and transmissive seed accumulator belt.

Figure 40:
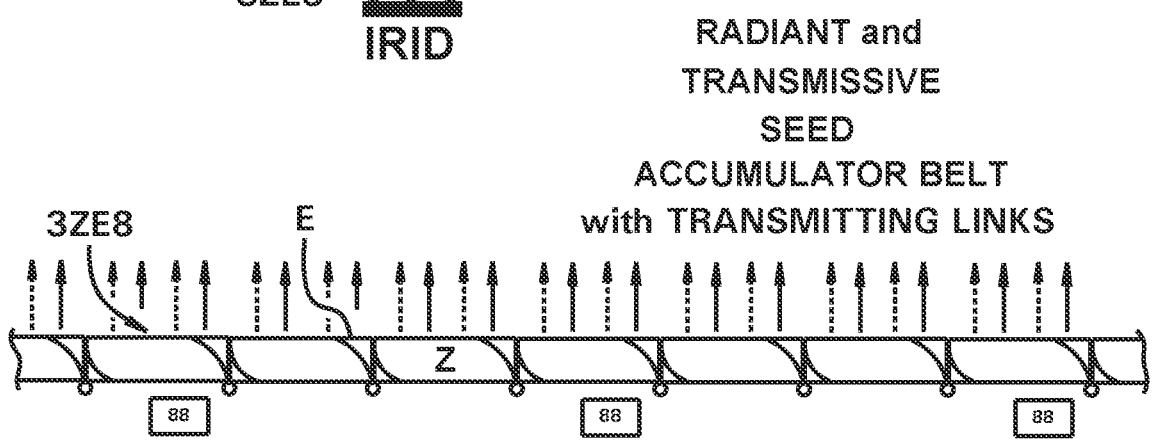
FIG. 40 shows a cross sectional depiction of a radiant and transmissive seed accumulator belt with transmitting links.

Now referring to FIG. 40, a cross sectional depiction of a radiant and transmissive seed accumulator belt of FIGS. 38 and 39 is shown comprising individual chain-like transmitting links. Radiant and transmissive seed accumulator belt 3ZE8 is now shown in another embodiment of the invention comprising a plurality of belt links Z as shown, illuminated from the underside on the Figure using a plurality of IRID emitters 88, with underside rays omitted for clarity. The emission of Medium Wavelength Infrared MWIR is omitted for clarity. The radiant seed accumulator belt 3ZE8 comprises a plurality of links so formed, linked, positioned and optically composed in a manner known those skilled in the optical arts to allow the Indigo Region Illumination Distribution to be transmitted link-to-link and also to be emitted from the plurality of links upward in the Figure to impinge upon the seed.

Figure 41:
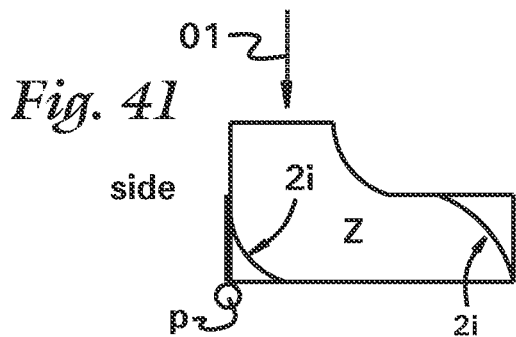
FIGS. 41 and 42 show side and top cross sectional views, respectively, of one link of the radiant and transmissive seed accumulator belt depicted in FIG. 40, with partial width input/output light reflectors shown.
Figure 42:
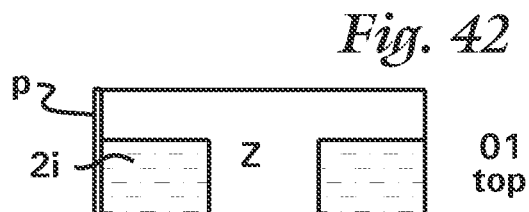

Now referring to FIGS. 41 and 42 side and top cross sectional views are shown, respectively, of one belt link Z of the radiant and transmissive seed accumulator belt 3ZE8 depicted in FIG. 40, with partial width input/output light reflectors shown. In FIG. 41, a side view (side) is shown showing a link or hinge pin p and two partial width input/output light reflectors 2i. A top view 01 of the belt link Z is shown in FIG. 42, showing link pin p at the left and partial width input/output light reflectors 2i from the top. Partial width input/output light reflectors 2i assist with light distribution as shown in the next Figure.

Figure 43:
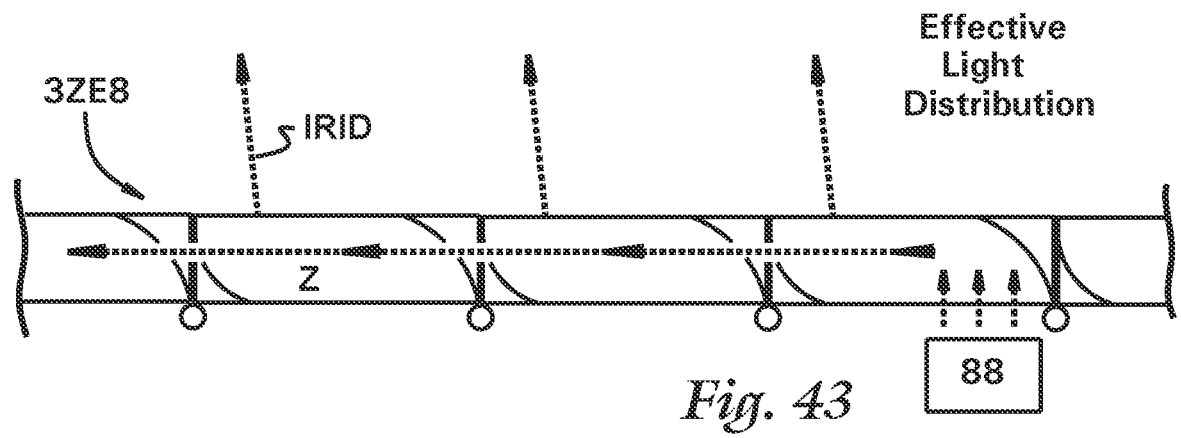
FIG. 43 shows the radiant and transmissive seed accumulator belt of FIG. 40, showing an illustrative effective light distribution from a IRID emitter.

Now referring to FIG. 43 the radiant and transmissive seed accumulator belt 3ZE8 of FIG. 40 is shown, and showing an illustrative effective light distribution from IRID emitter 88. Partial width input/output light reflectors 2i (not labeled for clarity in this Figure) can be made from aluminum, stainless steel, or metal foil, and laid in during manufacture of the belt links Z, preferably to take the form of borosilicate glass blocks in a manner known to those skilled in the glass and ceramic arts. In the Figure, as illustratively shown, light from IRID emitter 88 travels upward in the Figure, hits a partial width input/output light reflector 2i (full illustrative rays not shown) and is substantially reflected and now passing to the left in the Figure as shown by the chain of arrows. As this Indigo Region Illumination Distribution light passes leftward, it encounters periodically in the chain additional partial width input/output light reflectors 2i as it is transmitted from link to link traveling to the left. Each time it encounters a partial width input/output light reflector 2i formed for upward deflection of light, some of the Indigo Region Illumination Distribution light is reflected upward in the Figure, so as to illuminate a seed load.

This arrangement in the radiant and transmissive seed accumulator belt 3ZE8 allows for emission of Medium Wavelength Infrared radiation, as well as Indigo Region Illumination Distribution light, and allow for longer illumination dwell times for seed to be treated. Because of its chance nature, the statistical attribute associated with trying to get two sided illumination on seeds to increase effectiveness is improved using a continuously glowing belt. This can be supplemented with other direct sources MWIR emitters E and IRID emitters 88, and with reflectors, as well, to increase the number and directions of light impinging upon a seed.

Figure 44:
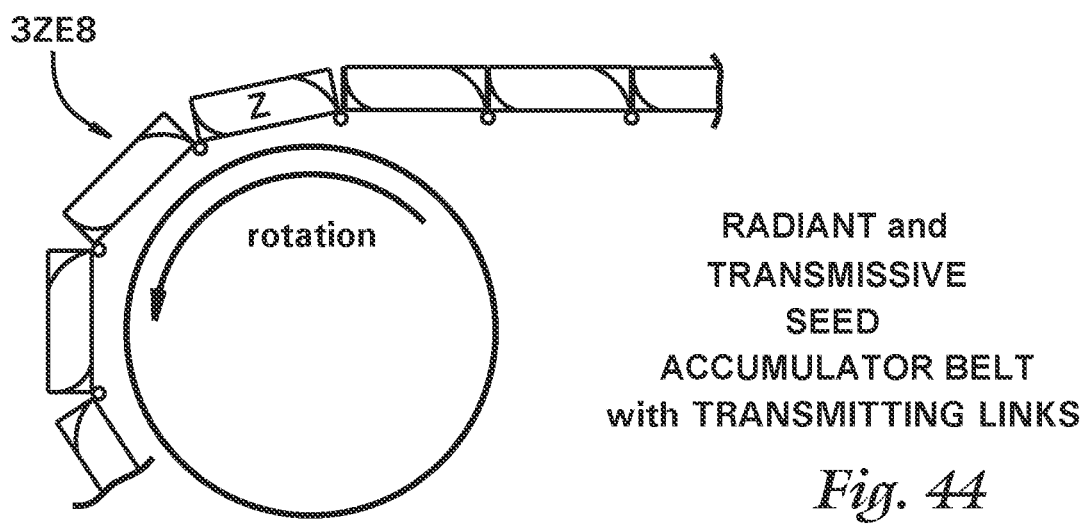
FIG. 44 shows the radiant and transmissive seed accumulator belt of FIG. 40, showing illustrative links opening upon rounding a curve.

Now referring to FIG. 44, the radiant and transmissive seed accumulator belt 3ZE8 of FIG. 40 is shown, with illustrative belt links Z opening upon rounding a curve, as shown with a rotating pulley shown rotating counter-clockwise in the figure. When the belt links Z open up upon going around a curve as shown, the chain of light transmission from link to link is broken somewhat (not shown) as the links no longer butt squarely, link-to-link. Belt links Z can still have provisions for pores that allow air to pass through them.

Figure 45:
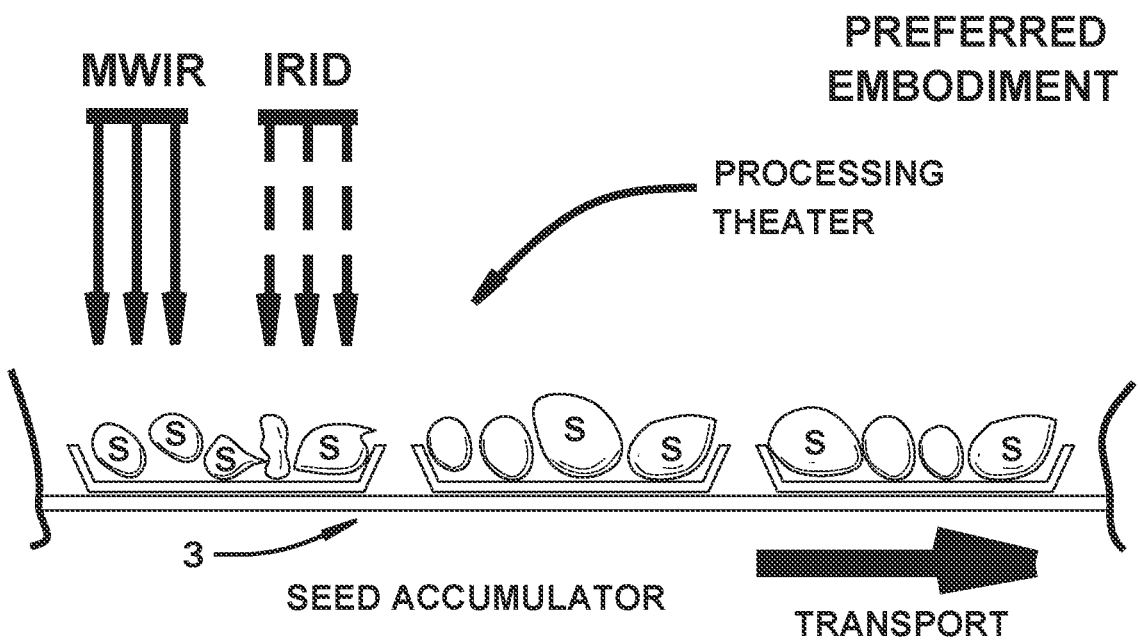
FIG. 45 shows a simple seed accumulator providing transport in a processing theater according to one embodiment of the invention.

Now referring to FIG. 45, a simple seed accumulator 3 is shown providing transport in a processing theater according to one embodiment of the invention. Individual trays or pockets can be used to transport (TRANSPORT) to the right in the Figure seeds inside the processing theater (PROCESSING THEATER).

Figure 46:
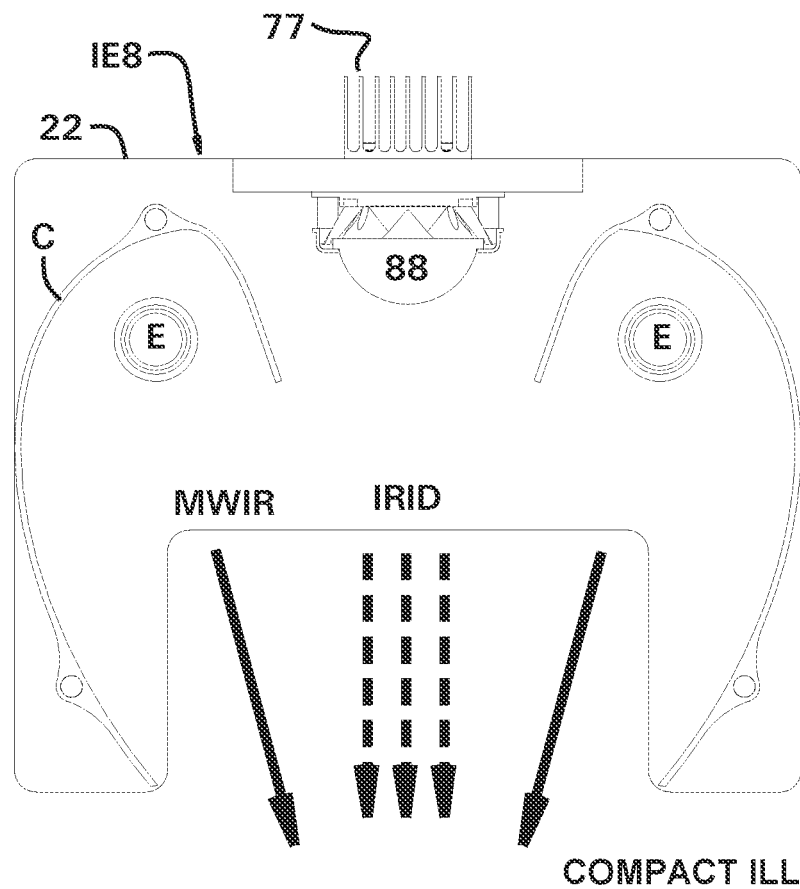
FIG. 46 shows a cross-sectional view of a possible compact illuminator according to the invention.
Figure 47:
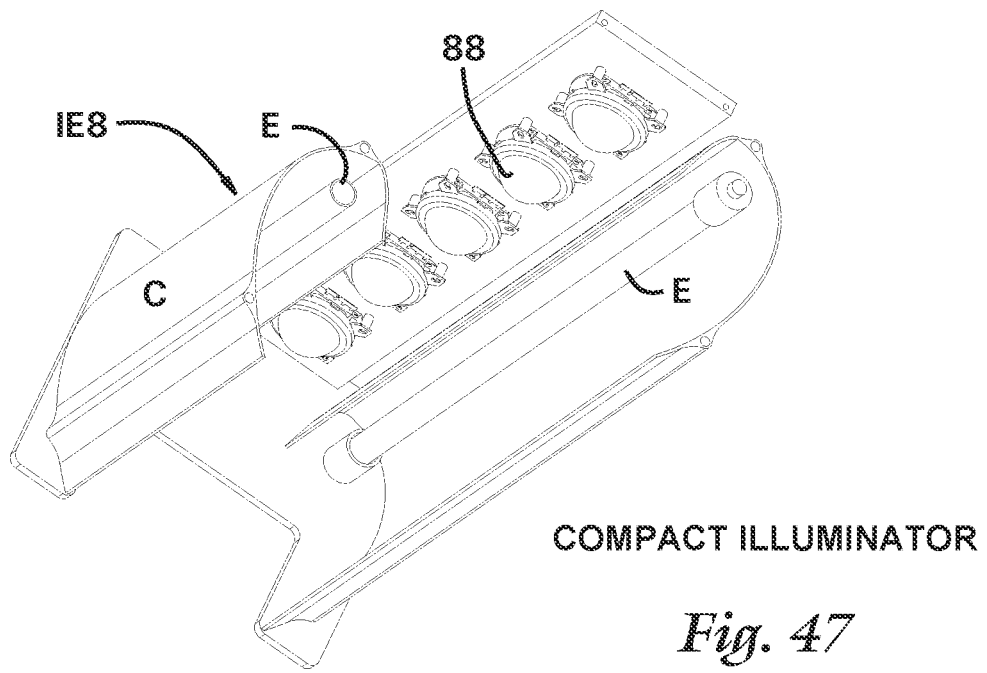
FIGS. 47 and 48 show oblique surface views of the compact illuminator depicted in FIG. 46.
Figure 48:
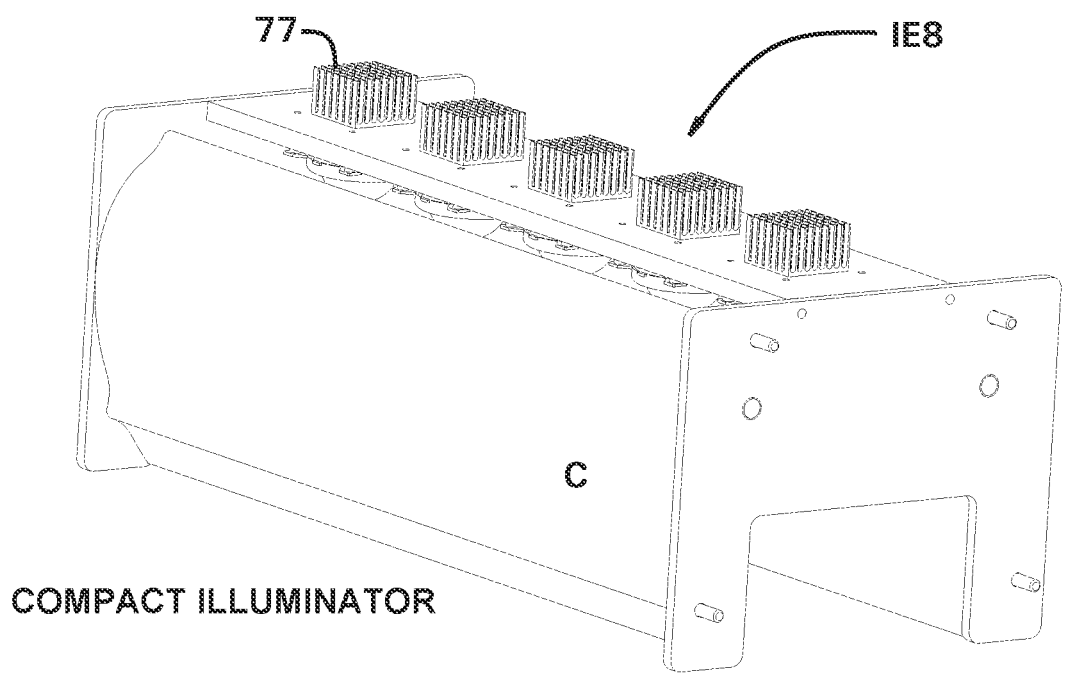

Now referring to FIG. 46, a cross-sectional view of a possible compact illuminator (COMPACT ILLUMINATOR, IE8) according to one embodiment of the invention is shown. Referring also to FIGS. 47 and 48, oblique surface views of the compact illuminator depicted in FIG. 46 are shown. In this illuminator IE8, a housing 22 retains a curved reflector C that surrounds two pipe-like MWIR emitters E as shown, oriented upon an axis (not shown) in the longest direction of the illuminator IE8 as depicted in FIG. 45. Light from pipe-like MWIR emitters E passes downward as in the Figure shown by the rays for Medium Wavelength Infrared MWIR, with assistance of the curved reflector C, as known in the optical arts. A central assembly (not labeled) houses a plurality of IRID emitters 88 that are positioned in between pipe-like MWIR emitters E, and this light, Indigo Region Illumination Distribution IRID, is shown also projected downward in the Figure. IRID emitters 88 are serviced by heat sinks 77 as shown, and can be 100 watt array, 450 nm peak output LED arrays with peak output at 430 nm, true indigo in appearance and with continuous distributions. This compact illuminator can be used to illuminate, either directly or from the underside, any of the seed accumulator belt 3Z, 3ZE, 3Z8, or 3ZE8 previously described. It is suitable for inclusion inside a harvester combine after the threshing process.

The interiors (not explicitly shown) of MWIR emitters E can comprise heaters; or tubular lamps as previously described, such as a clear halogen heat lamp, which essentially acts as a cartridge heater with a glass or quartz exterior. Alternatively, a preferred embodiment can comprise the tubular MWIR emitters E as shown with an emissive coating, such as a known aluminum oxide ceramic, or MWIR emitters E can comprise copper pipes sprayed with glass, or with aluminum oxide thermal spray. Any high emissivity coating on a thermally heated tube could offer advantages so long as the emissions are as called for in the protocol for the invention, preferably Medium Wavelength Infrared in the range of 2 to 8 micron wavelengths.

Figure 49:
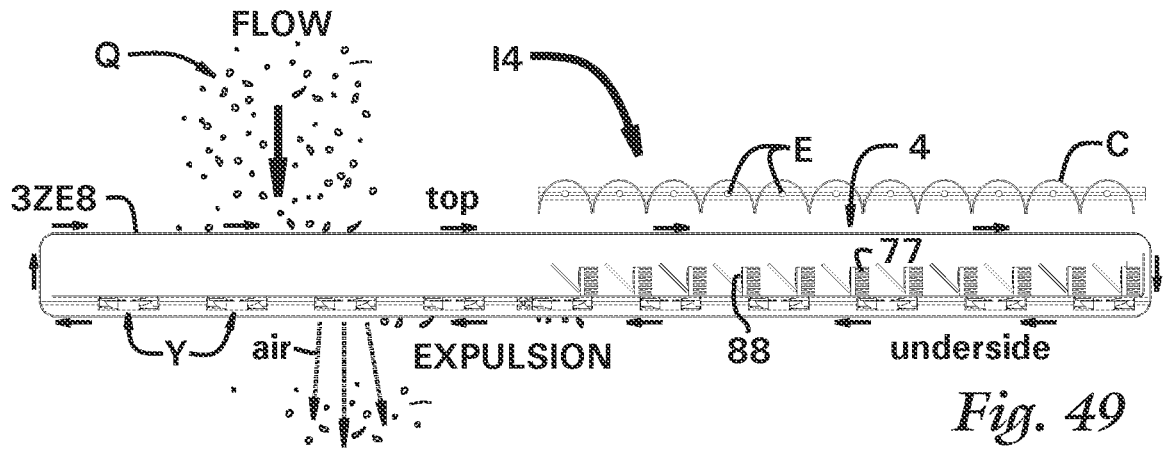
FIG. 49 shows a cross-sectional view of an illuminated external wrap radiant and transmissive seed accumulator belt forming an illumination unit according to the invention, and featuring air suction through the belt to attract harvest or seeds to be treated, and air expulsion through the belt to expel treated harvest or seeds.
Figure 50:
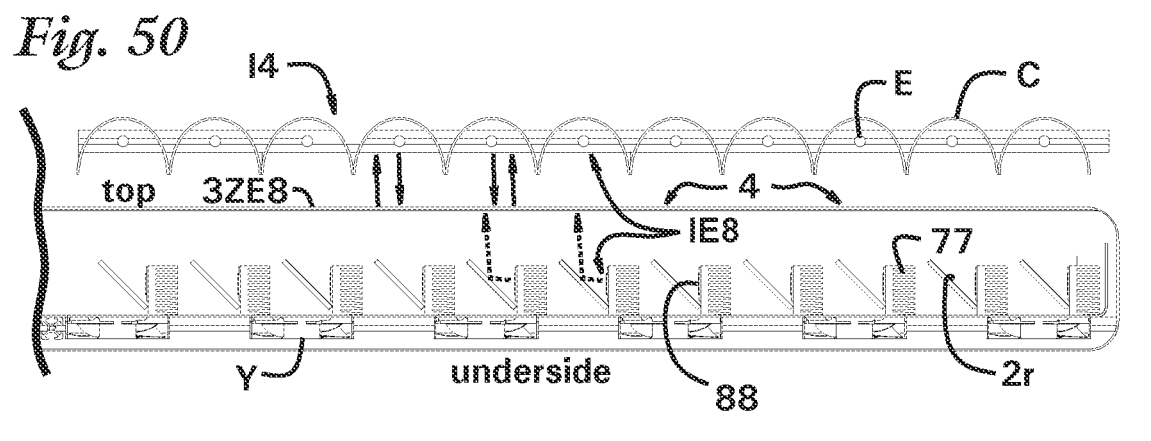
FIG. 50 shows the cross-sectional view of an illuminated external wrap radiant and transmissive seed accumulator belt forming an illumination unit according to the invention in a partial close-up view.
Figure 51:
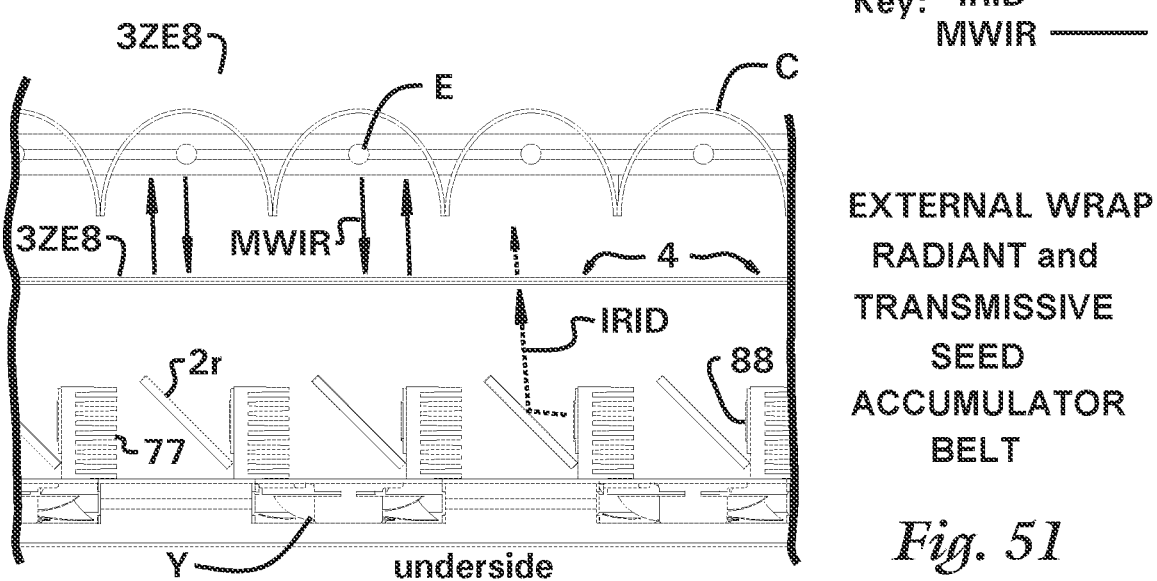
FIG. 51 shows the cross-sectional view of an illuminated external wrap radiant and transmissive seed accumulator belt forming an illumination unit according to the invention in a further magnified close-up view.

Now referring to FIG. 49, a cross-sectional view of an illuminated external wrap radiant and transmissive seed accumulator belt forming an illumination unit I4 according to the invention, and featuring air suction through the belt itself to attract harvest or seeds to be treated, and air expulsion through the belt to expel treated harvest or seeds. Referring also to FIG. 50, the cross-sectional view of an illuminated external wrap radiant and transmissive seed accumulator belt forming an illumination unit according to the invention of FIG. 49, is shown in a partial close-up view. Referring also to FIG. 51, the cross-sectional view of an illuminated external wrap radiant and transmissive seed accumulator belt forming an illumination unit according to the invention of FIG. 50, is shown in a further magnified close-up view.

These FIGS. 49, 50, and 51 depict an illumination unit I4 which comprises a plurality of illuminators IE8 which illuminate a processing theater 4 populated with a harvest Q according to the invention. The illumination unit I4 is formed as shown on the surface of an external wrap radiant and transmissive seed accumulator belt 3ZE8, which forms a rectangular wrap as shown in FIG. 49. The radiant and transmissive seed accumulator belt 3ZE8 is shown moving in a rectangular track on the Figure page, rotating clockwise on the page of FIG. 49, as shown by the transport or motion arrows which point to the right on the belt top (shown, top); downward on the Figure right side; leftward on the belt underside (underside), and upward on the Figure left side. In the interior of the external wrap of the radiant and transmissive seed accumulator belt 3ZE8 are a plurality of IRID emitters 88 mounted therein, with associated heat sinks 77 and a series of reflectors 2r which redirect light as shown in FIG. 51. FIG. 51 shows Indigo Region Illumination Distribution IRID light emitted initially to the left in the Figure, then redirected by reflector 2r to become an upward ray as shown. This upward IRID ray passes through the radiant and transmissive seed accumulator belt 3ZE8 to emerge for the purpose of illuminating seeds at processing theater 4.

The plurality of MWIR emitters E and associated curved reflectors C shown perform two functions: they illuminate directly the processing theater 4 and associated seeds, shown by the downward Medium Wavelength Infrared MWIR rays; and they heat up the radiant and transmissive seed accumulator belt 3ZE8 so it becomes a MWIR emitter itself, and this is shown by the upward Medium Wavelength Infrared MWIR rays.

Because the radiant and transmissive seed accumulator belt 3ZE8 is porous to air, and because the external wrap formed by the belt is somewhat hermetically sealed (provisions known to those skilled in the mechanical arts, but not shown), a plurality of expulsion fans Y (of known construction) at the belt underside (a second portion of the belt) as shown allow for a negative pressure or vacuum to be created within the interior of radiant and transmissive seed accumulator belt 3ZE8. This allows for material handling and transporting the seed to and from the processing theater, specifically radiant and transmissive seed accumulator belt 3ZE8. As shown in FIG. 49, a flow (FLOW) of harvest Q descends under vacuum action upon radiant and transmissive seed accumulator belt 3ZE8 at a first portion of the belt, with the seeds attracted to, and retained by the belt as it moves rightward on top (seeds not shown on the belt for clarity). The seeds cling to the belt through processing theater 4, travel downward, and then to the left on the belt underside, where due to gravity and due to the expulsion of air afforded by expulsion fans Y, the seeds are expelled (EXPULSION) downward in the Figure as shown. This assembly can be put anywhere there is a seed flow in a harvester combine.

Figure 52:
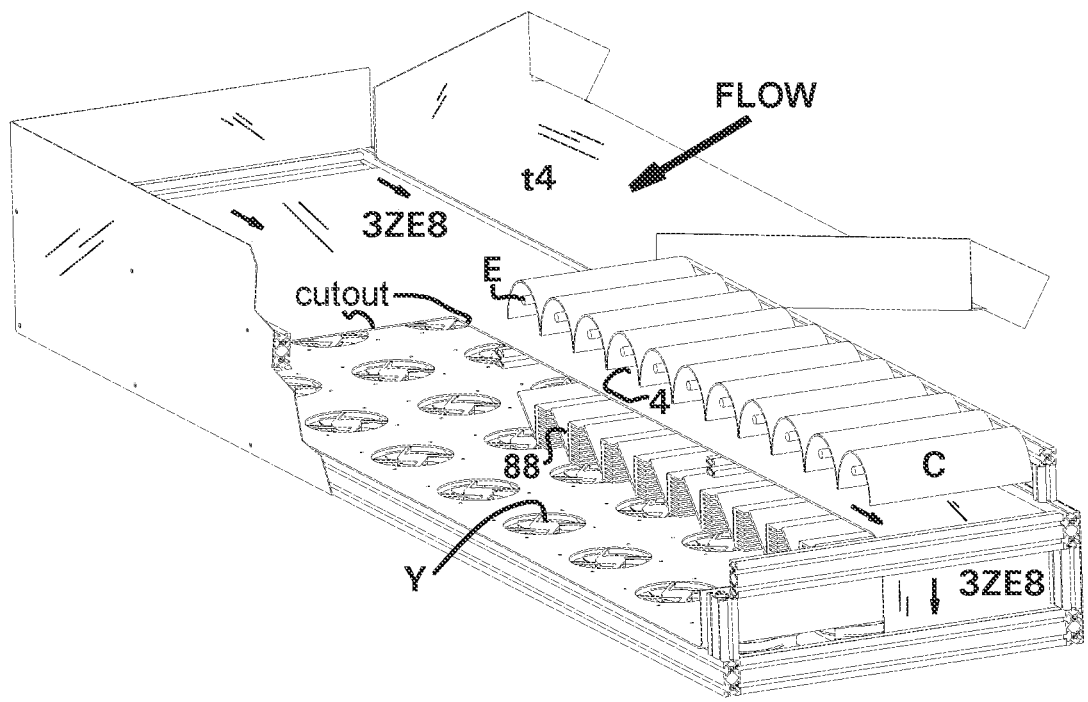
FIGS. 52 and 53 show oblique surface views of the illumination unit of FIGS. 49-51, with FIG. 52 featuring a drawing figure cutout to show interior components normally hidden.
Figure 53:
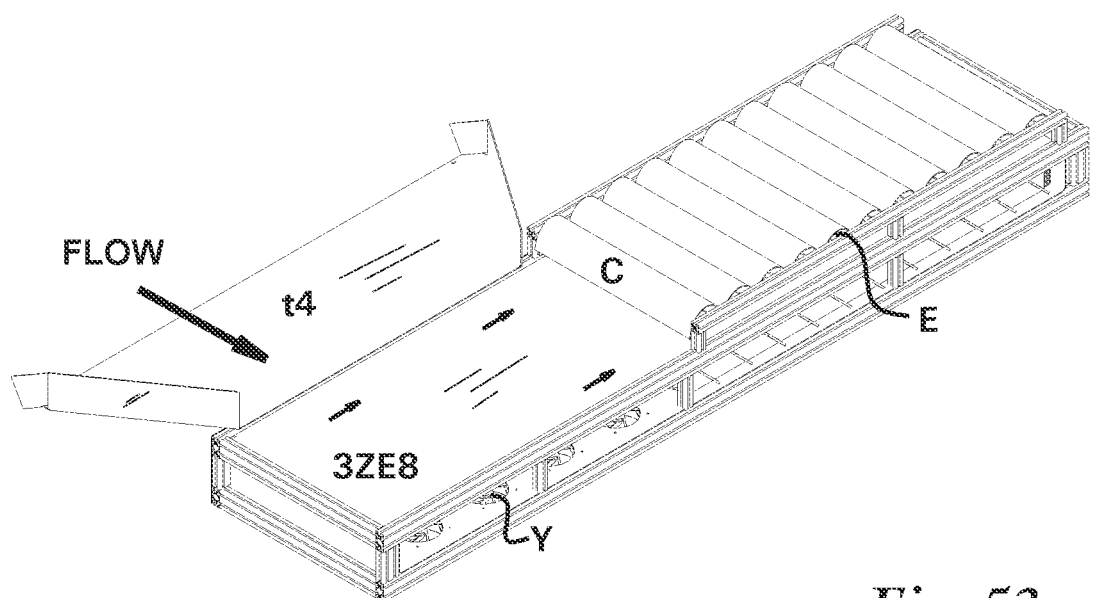

Now referring to FIGS. 52 and 53, oblique surface views of the illumination unit of FIGS. 49-51, are shown, with FIG. 52 featuring a drawing figure cutout to show interior components normally hidden. As depicted, a seed flow (FLOW) enters a trough or tray t4 and interacts with radiant and transmissive seed accumulator belt 3ZE8 which is in motion, driven by a motor and pulley (not shown). The seeds move across the Figure generally to the right, enter processing theater 4, and once there, are exposed to Medium Wavelength Infrared radiation emitted from MWIR emitters E with aid of curved reflectors C, as well as by the thermal emissions of the belt itself, while IRID emitters 88 illuminate the belt underside. The IRID emitters 88 and expulsion fans Y can be seen through a cutout (cutout).

The conveyor represented by radiant and transmissive seed accumulator belt 3ZE8 can be of dimensions 47 inches (119 cm) by 89 inches (225 cm). This apparatus can be attached to a harvester combine, such as a Class 6 New Holland CR940 combine with a 30 ft cutting head.

With the growth of large farms utilizing precise seeding intervals in rows, typically 30 inches apart, advanced mechanized farm implements known as agricultural planters or planters are in wide use for sowing seeds. Planters are typically drawn by tractors and can possess a large number of modules or row units that individually deposit seeds at regular intervals. The soil is opened into generally a V-shape trench, using a cutting disc or other mechanism, a seed is dropped or thrown into that trench, and then the trenched is closed using another disc or traveling implement. The John Deere DB120, manufactured by John Deere (Moline, Illinois, USA) is the largest in the world, possessing 48 row units. Traveling a 5-5.5 miles per hour ground speed, it can sow 90-100 acres per hour ($4/10$ km$^2$/hour). Modern planters use planter speed-matching delivery and GPS (Global Positioning System) to assist in advantageous seed drop and aligning of multiple passes of the planter on a field. They also can perform fertilization, such as the ExactRate™ Fertilizer System manufactured by (John Deere, Moline, Illinois, USA). The instant invention can be used to advantage to provide rapid pulse programming of seeds before or while they are planted or deposited onto a field, to obtain improved germination probability, increased root mass, and increased crop yield.

Referring now to FIG. 54, a cross-sectional schematic view of metering and accumulation points in a prior art agricultural planter is shown. Metering unit housing M10 contains seed accumulation points (shown, SEED ACCUMULATION) prepare seeds to be taken up (see arrow) by a metering mechanism (not explicitly shown) shown by SEED METERING as indicated, assisted by the vaned wheel at the center of the Figure. Associated seed discs with apertures to hold seeds to effectuate metering, vacuum and pressure systems to transport seeds, sorting brushes—and other conventional known components such as used in the conventional metering process are not shown for clarity. Seeds typically emerge single-file as shown on the right side of the Figure (singulated, or having undergone singulation) for downstream processing (not shown, see FIG. 55). Each such singulated seed is deposited in separated intervals on the agricultural field.

Figure 55:
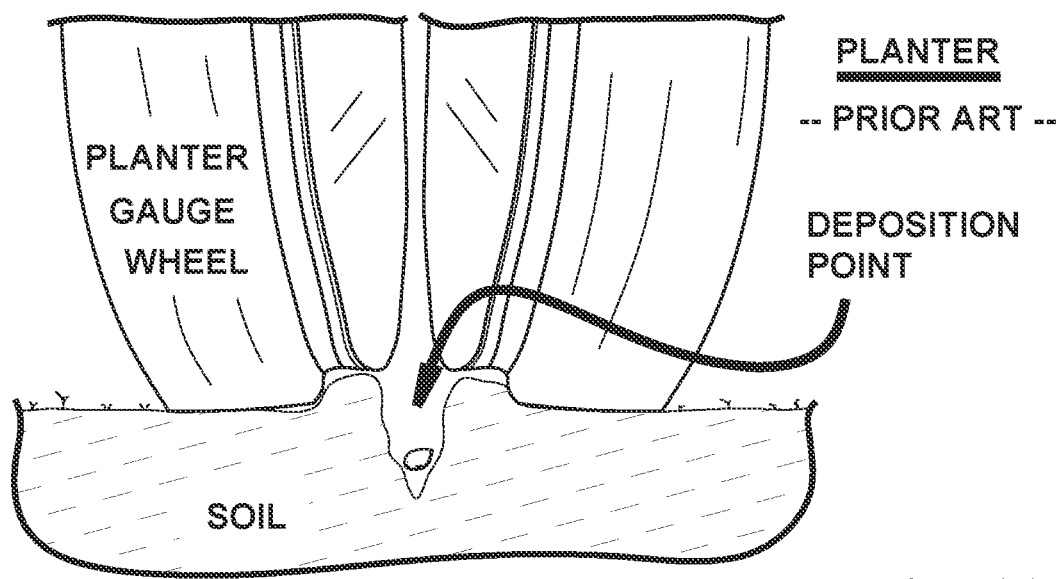
FIG. 55 shows a cross-sectional schematic view of a deposition point in a prior art agricultural planter.

Referring now to FIG. 55 a cross-sectional schematic view of a deposition point in a prior art agricultural planter is shown. The seeds that are singulated (FIG. 54) are conveyed using hoses or conduits (not shown) to be proximate soil opening and closing mechanisms (not shown) that open and close a trench on the agricultural field, situated on the field between left right planter gauge wheels (PLANTER GAUGE WHEEL). The planter gauge wheels can feature tires that possess inset soil retention grooves at the inboard side of each wheel as shown in the Figure. Generally, the planter operates to form a trench into which seeds are deposited or thrown one at time, following up by closing the trench. Such a trench is shown containing a seed, labeled DEPOSITION POINT, with the trench cut into the SOIL, seen in cross-section.

Now referring to FIG. 56, a close-up of the schematic cross-sectional view of FIG. 55 is shown, depicting schematically illumination at the deposition point of the agricultural planter according to the invention. As can be seen, an illuminator IE8 is shown schematically in the trench showing a seed. This can represent any possible illumination of that seed on the way to, or after falling in, the trench. Those of ordinary skill can devise array and placement of illuminator IE8 to practice the invention as taught and claimed, making the planter an ILLUMINATED PLANTER.

Now referring to FIG. 57, the cross-sectional schematic view of metering and accumulation points in the prior art agricultural planter of FIG. 54, with possible illuminators shown according to the invention. In this Figure, the metering unit housing M10 of FIG. 54 is shown, housing or accommodating illustrative illuminators IE8 are sized, positioned, operated, deployed, and energized to illuminate seeds in the illuminated agricultural planter according to the invention. Illuminators IE8 can be trained upon seeds as they accumulate in the metering unit housing, or as they are sorted and manipulated on the way to metering and singulation. They can also be illuminated according to the invention as they exit, singulated, as shown on the right side of the Figure.

Figure 58:
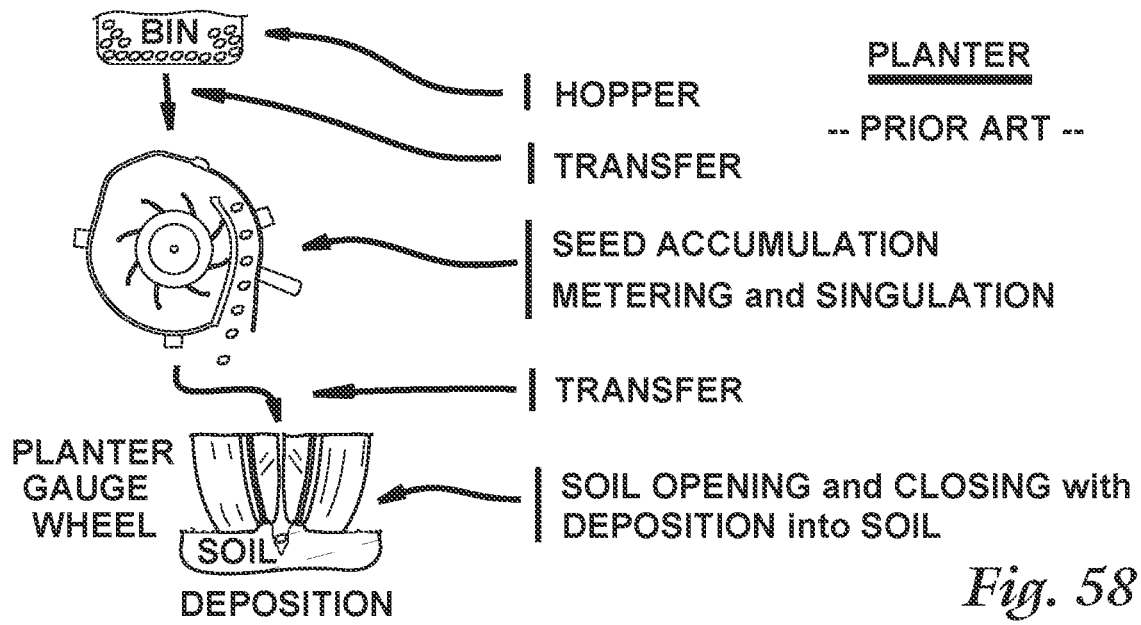
FIG. 58 shows a functional schematic diagram of a prior art agricultural planter.

Referring to FIG. 58, a functional schematic diagram of a prior art agricultural planter is shown where flow is shown, component-to-component. At the top of the Figure, a storage bin BIN acts as a HOPPER as shown receiving seeds to be input into the planter for deposition ultimately on an agricultural field. The seeds are conveyed typically using hoses or conduits, not shown (TRANSFER) for SEED ACCUMULATION, METERING and SINGULATION as shown and as described in FIG. 54 above. Another TRANSFER as shown, using pathways and conduits not shown, brings the seeds to the deposition phase, with SOIL OPENING and CLOSING with DEPOSITION into SOIL as shown. These are typical or basic functions and portions of a modern agricultural planter.

Figure 59:
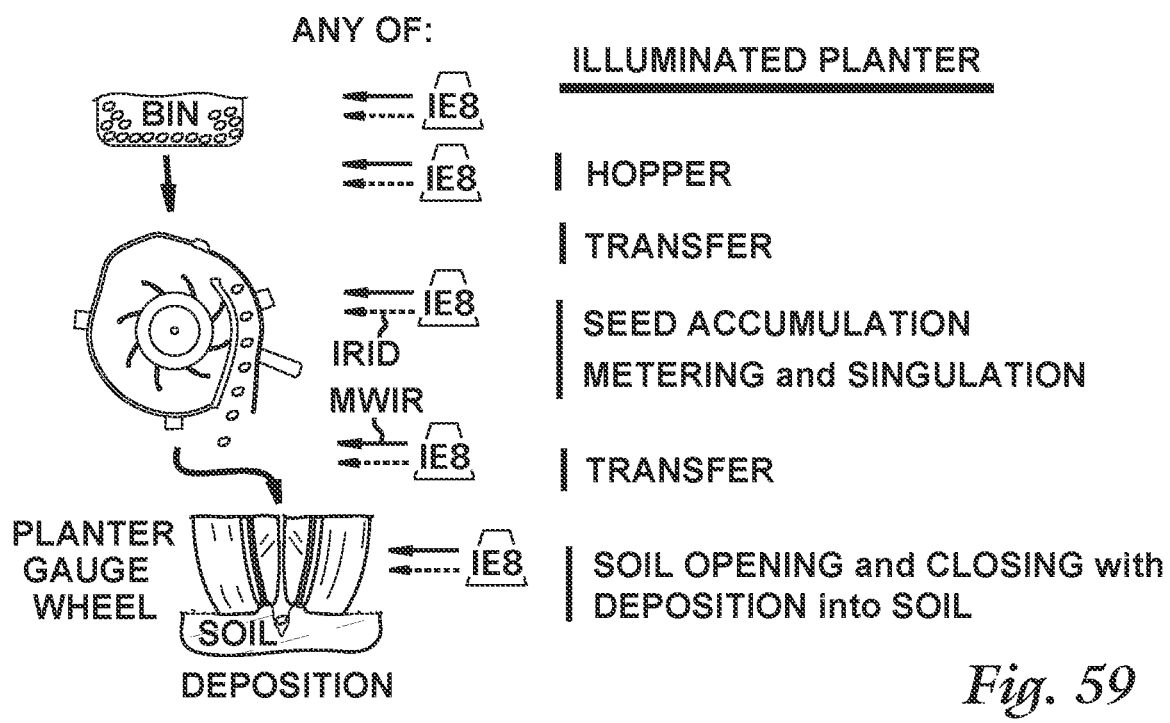
FIG. 59 shows the functional schematic diagram of the agricultural planter of FIG. 58, with possible illuminators shown at various functional points according to the invention.

Referring finally now to FIG. 59, the functional schematic diagram of the agricultural planter of FIG. 58 according to the invention with possible illuminators shown at various functional points. This ILLUMINATED PLANTER can feature illuminators IE8 as shown schematically offering illumination to different and illustrative parts of the illuminated planter process. Specifically possible locations for illuminators IE8 according to the invention can illuminate seeds at a hopper; either of two transfer points; a seed accumulation point; a seed metering point; a soil opening point; a soil closing point; and on oar about a seed deposition point of said agricultural planter. The partial illumination of seeds at various points, step by step, can read on the invention as claimed as long as the minimum average irradiance and maximum average irradiance as taught and claimed in the instant disclosure are met, and as long as the narrow specific range of cumulative illumination energy in Joules/cm$^2$ is followed. Those of ordinary skill can devise, using the teachings herein, multiple illuminations provided at various points that meet the average irradiance and cumulative illumination energy requirements as taught and claimed without departing from the scope of the claims. For example, light sources can be chosen and sized and arrayed and operated to provide a time average irradiance of 0.2 Watts/cm$^2$ for seeds in motion from component to component in the illuminated planter.

In practicing the invention, one can use intermittent sources, a flash or flashes, without departing from the scope of the appended claims, but overall, irradiances should be kept to less than 7 W/cm$^2$ average to avoid flash ignition of seeds.

Generally, regarding exposures as taught and claimed herein, there are many possible factors which would require a practitioner of the method of the invention to change exposures, such as the varied effectiveness of the invention on many varied different plant species; plant environmental history, prior sun exposure, history of rain or water uptake, miscellaneous species factors; plant condition; and soil factors. So those skilled in the agricultural arts will realize that specific exposures within the scope of the appended claims can be adjusted to optimize results.

Multiple applications of the instant invention, such as lower dose applications can be contemplated whereby improved germination viability, increased root mass and crop yield can increase with multiple applications.

The invention can be set in motion using known means to accomplish the same objectives over a wide area, such as a wide processing theater, perhaps on the ground plane or on soil. Other harvest transport methods, such as pulsed shots of air, can be used to moved harvest to and from a processing theater using known techniques from the materials handling arts without departing from the scope of the appended claims. Autonomous, non-autonomous, powered, or non-powered vehicles can be used to illuminate or treat a field, using illumination as taught and claimed, or using communication to other, external light sources. The invention can also be combined with other processes, including transport, cleaning and sorting processes not mentioned in this disclosure without departing from the appended claims.

Known imaging optics can be added to practice the protocol of the invention, including beam forming using parabolic curved sections, or sections that resemble a compound parabolic curve; and non-imaging optics can also be used. If desired, one can redirect all electromagnetic emissions as taught and claimed in the instant disclosure using mirrors, lenses, foil arrays, or light guides and pipes without departing from the scope of the invention. Similarly, those of ordinary skill can add light wavelengths to the exposure protocols without departing from the invention or the appended claims.

Measurement units were chosen illustratively and in the appended claims include irradiance in W/cm$^2$ but radiance or other similar measures can be used and would by fair conversion read upon the appended claims if equivalent.

For clarity, the invention has been described in structural and functional terms. Those reading the appended claims will appreciate that those skilled in the art can formulate, based on the teachings herein, embodiments not specifically presented here without departure from the claims.

Production, whether intentional or not, of irradiance levels that are under the magnitude of powers as given in the appended claims shall not be considered a departure from the claims if a power level as claimed is used at any time during treatment.

The illumination protocol disclosed and claimed can be supplemented with visible light, which can enhance user safety by increasing avoidance and can allow for pupil contraction of the eye of an operator; other radiations can be added with without departing from the appended claims.

There is obviously much freedom to exercise the elements or steps of the invention.

The description is given here to enable those of ordinary skill in the art to practice the invention. Many configurations are possible using the instant teachings, and the configurations and arrangements given here are only illustrative.

Those with ordinary skill in the art will, based on these teachings, be able to modify the invention as shown.

The invention as disclosed using the above examples may be practiced using only some of the optional features mentioned above. Also, nothing as taught and claimed here shall preclude addition of other structures, functional elements, or systems.

Obviously, many modifications and variations of the present invention are possible in light of the above teaching.

It is therefore to be understood that, within the scope of the appended claims, the invention may be practiced otherwise than as specifically described or suggested here.

We claim:

1. A method for rapid pulse programming of a seed, to obtain at least one of improved germination probability, increased root mass, and increased crop yield, wherein said method comprises:

illuminating said seed with electromagnetic radiation of a wavelength distribution ranging from 300 nm to 20 microns, and said illuminating so formed and arrayed and timed to illuminate said seed with a minimum average irradiance of 0.2 Watts/cm$^2$ and a maximum average irradiance of 7 Watts/cm$^2$, and also having a narrow specific range of cumulative illumination energy from ½ Joule/cm$^2$ to 15 Joules/cm$^2$ and a transition point cumulative illumination energy Emax Joules/cm$^2$, so as to specifically engage and cause an irradiance-sensitive and energy-sensitive hidden stimulative exposure response in said seed within said narrow specific range of cumulative illumination energy, and so as to avoid illumination of higher cumulative illumination energy that would cause a different and destructive exposure response in said seed;

wherein:
said seed is transported to and from a processing theater that comprises a seed accumulator; and
said processing theater is inside a combine harvester, and said transporting comprises transporting said seed from a thresher of said combine harvester to said processing theater.

2. The method of claim 1, wherein said rapid pulse programming of a seed is preceded by a warmup illumination comprising illuminating said seed with electromagnetic radiation of a wavelength distribution ranging from 300 nm to 20 microns with a minimum average irradiance of 0.2 Watts/cm$^2$ for a total cumulative illumination energy of less than ½ Joule/cm$^2$.

3. The method of claim 1, wherein said wavelength distribution comprises both Medium Wavelength Infrared (MWIR) radiation and an Indigo Region Illumination Distribution (IRID).

4. A method for rapid pulse programming of a seed, to obtain at least one of improved germination probability, increased root mass, and increased crop yield, wherein said method comprises:

illuminating said seed with electromagnetic radiation of a wavelength distribution ranging from 300 nm to 20 microns, and said illuminating so formed and arrayed and timed to illuminate said seed with a minimum average irradiance of 0.2 Watts/cm$^2$ and a maximum average irradiance of 7 Watts/cm$^2$, and also having a narrow specific range of cumulative illumination energy from ½ Joule/cm$^2$ to 15 Joules/cm$^2$ and a transition point cumulative illumination energy Emax Joules/cm$^2$, so as to specifically engage and cause an irradiance-sensitive and energy-sensitive hidden stimulative exposure response in said seed within said narrow specific range of cumulative illumination energy, and so as to avoid illumination of higher cumulative illumination energy that would cause a different and destructive exposure response in said seed;

wherein:
said seed is transported to and from a processing theater that comprises a seed accumulator; and
said processing theater is inside a heated tube auger-fed exposure unit, so constructed, sized and operated to provide said illuminating internally to said seed.

5. The method of claim 4, wherein said rapid pulse programming of a seed is preceded by a warmup illumination comprising illuminating said seed with electromagnetic radiation of a wavelength distribution ranging from 300 nm to 20 microns with a minimum average irradiance of 0.2 Watts/cm$^2$ for a total cumulative illumination energy of less than ½ Joule/cm$^2$.

* * * * *